United States Patent
Hayashi

(10) Patent No.: US 10,755,097 B2
(45) Date of Patent: Aug. 25, 2020

(54) INFORMATION PROCESSING DEVICE, INFORMATION PROCESSING METHOD, AND RECORDING MEDIUM WITH PROGRAM STORED THEREIN

(71) Applicant: NEC Corporation, Minato-ku, Tokyo (JP)

(72) Inventor: Katsutoshi Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 130 days.

(21) Appl. No.: 15/763,213

(22) PCT Filed: Sep. 15, 2016

(86) PCT No.: PCT/JP2016/004212
§ 371 (c)(1),
(2) Date: Mar. 26, 2018

(87) PCT Pub. No.: WO2017/056436
PCT Pub. Date: Apr. 6, 2017

(65) Prior Publication Data
US 2018/0307891 A1    Oct. 25, 2018

(30) Foreign Application Priority Data
Sep. 30, 2015    (JP) ................... 2015-195431

(51) Int. Cl.
*G06K 9/00* (2006.01)
*G06Q 30/06* (2012.01)
*G07G 1/00* (2006.01)
*G06Q 10/04* (2012.01)
*G06Q 10/06* (2012.01)
(Continued)

(52) U.S. Cl.
CPC ....... *G06K 9/0063* (2013.01); *G06K 9/00778* (2013.01); *G06Q 10/04* (2013.01);
(Continued)

(58) Field of Classification Search
CPC ............ G01G 19/4144; G06K 9/0063; G06K 9/00778; G06Q 10/04; G06Q 10/063;
(Continued)

(56) References Cited

U.S. PATENT DOCUMENTS

| 2013/0030875 A1 | 1/2013 | Lee et al. | |
| 2014/0180848 A1* | 6/2014 | Argue | G07G 1/0036 705/16 |
| 2014/0236653 A1* | 8/2014 | Farrell | G07G 1/0036 705/7.15 |

FOREIGN PATENT DOCUMENTS

| JP | H10-269453 A | 10/1998 |
| JP | H11-161849 A | 6/1999 |

(Continued)

OTHER PUBLICATIONS

International Search Report for PCT Application No. PCT/JP2016/004212, dated Dec. 13, 2016.
(Continued)

*Primary Examiner* — Nirav G Patel

(57) ABSTRACT

This information processing device 10 is provided with a product quantity estimating unit 14 (detecting means) and a wait time estimating unit 18: the product quantity estimating unit 14 detects the number of shopping baskets held by people lined up at a product registration device (POS device); the wait time estimating unit 18 calculates a wait time prediction value for each product registration device on the basis of the number of shopping baskets; the product quantity estimating unit 14 detects the shopping baskets, and estimates the quantity of products held by each person lined up at each product registration device; the wait time estimating unit 18 calculates the wait time prediction value for each product registration device on the basis of the quantity of products held by each person lined up at each product registration device.

10 Claims, 26 Drawing Sheets

(51) Int. Cl.
*G06T 7/00* (2017.01)
*G01G 19/414* (2006.01)

(52) U.S. Cl.
CPC ........... *G06Q 10/063* (2013.01); *G06Q 30/06* (2013.01); *G06T 7/0002* (2013.01); *G07G 1/0036* (2013.01); *G01G 19/4144* (2013.01); *G06T 2207/30242* (2013.01)

(58) Field of Classification Search
CPC .......... G06Q 30/06; G06T 2207/30242; G06T 7/0002; G07G 1/0036
See application file for complete search history.

(56) References Cited

FOREIGN PATENT DOCUMENTS

| | | | |
|---|---|---|---|
| JP | 2007-058492 A | | 3/2007 |
| JP | 2007-265290 A | | 10/2007 |
| JP | 2011-096140 A | | 5/2011 |
| JP | 2011096140 A | * | 5/2011 |
| JP | 2011-112893 A | | 6/2011 |
| JP | 2013-030086 A | | 2/2013 |
| JP | 2013-037452 A | | 2/2013 |
| JP | 2014-531066 A | | 11/2014 |

OTHER PUBLICATIONS

English translation of Written opinion for PCT Application No. PCT/JP2016/004212.
Japanese Office Action for JP Application No. 2015-195431 dated Oct. 15, 2019 with English Translation.

* cited by examiner

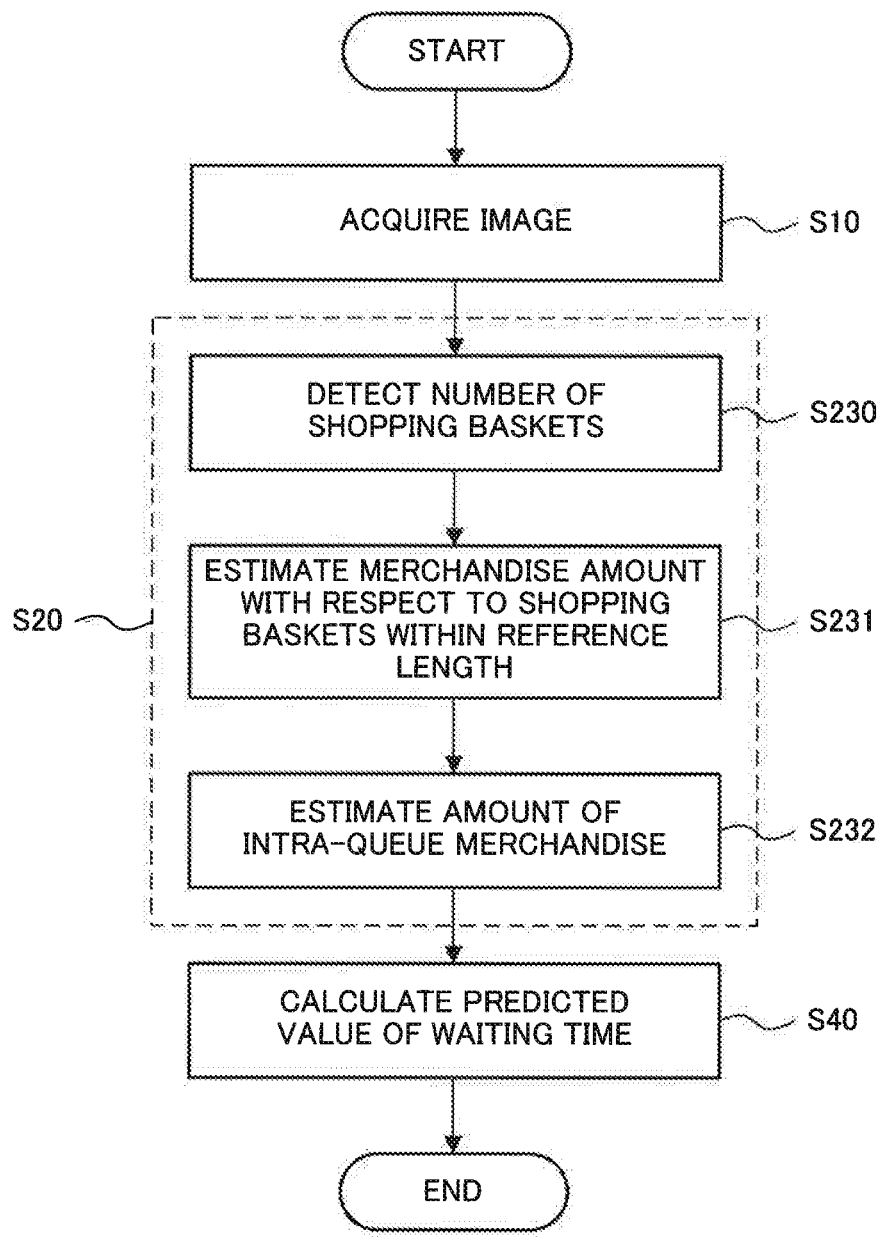

INFORMATION PROCESSING DEVICE, INFORMATION PROCESSING METHOD, AND RECORDING MEDIUM WITH PROGRAM STORED THEREIN

This application is a National Stage Entry of PCT/JP2016/004212 filed on Sep. 15, 2016, which claims priority from Japanese Patent Application 2015-195431 filed on Sep. 30, 2015, the contents of all of which are incorporated herein by reference, in their entirety.

TECHNICAL FIELD

The present invention relates to an information processing device, an information processing method, a program, and the like.

BACKGROUND ART

At a checkout counter in a store such as a supermarket, a queue for waiting for merchandise registration and the like is formed. Each customer intends to queue up for a checkout counter with a minimum waiting time, out of a plurality of checkout counters, by observing a length of each queue.

For example, PTL 1 describes a technology of recognizing merchandise by extracting an outline of the merchandise appearing in an image, and calculating and reporting a registration time.

PTL 2 describes a technology of obtaining and displaying a progress status of registration by measuring a weight of unregistered merchandise and a weight of registered merchandise.

PTL 3 describes a technology of detecting a number of customers in a queue or a length of a queue, and guiding a customer to a queue with a less waiting time.

CITATION LIST

Patent Literature

PTL 1: Japanese Unexamined Patent Application Publication No. 2013-37452
PTL 2: Japanese Unexamined Patent Application Publication No. 2013-30086
PTL 3: Japanese Unexamined Patent Application Publication No. 2011-112893

SUMMARY OF INVENTION

Technical Problem

A customer observes a length or the like of a queue for each checkout counter and selects a queue with a seemingly short waiting time. However, contrary to the expectation, another queue may have a shorter waiting time, and the customer may feel dissatisfied.

On the other hand, the technologies in PTLs 1 to 3 are not able to properly provide information about a waiting time. For example, the methods in PTLs 1 and 2 are not able to predict a waiting time for each checkout counter including people at the rear part of a queue.

Further, the method in PTL 3 does not consider an amount of merchandise held by a customer, and therefore a deviation from an actual waiting time is large.

The present invention is made in view of the aforementioned problems. An object of the present invention is to provide a customer with information about a waiting time.

Solution to Problem

The present invention provides an information processing device including:
detection means for detecting a number of shopping baskets of people queuing up for a POS device; and
a waiting time calculation means for calculating a predicted value of a waiting time for each of the POS devices on the basis of the number of the shopping baskets.

The present invention provides an information processing method including:
a detection step of detecting a number of shopping baskets of people queuing up for a POS device; and
a waiting time calculation step of calculating a predicted value of a waiting time for each of the POS devices on the basis of the number of the shopping baskets.

The present invention provides a computer program for providing an information processing device or a recording medium storing the computer program, the computer program causing a computer to function as:
detection means for detecting a number of shopping baskets of people queuing up for a POS device; and
waiting time calculation means for calculating a predicted value of a waiting time for each of the POS devices on the basis of the number of the shopping baskets.

Advantageous Effects of Invention

The present invention is able to provide a customer with information about a waiting time.

BRIEF DESCRIPTION OF DRAWINGS

FIG. 33 is a flowchart exemplifying a flow of processing executed by an information processing device according to a modified example of the tenth example embodiment.

DESCRIPTION OF EMBODIMENTS

Example embodiments of the present invention will be described below using drawings. Note that, in all drawings, a similar reference sign is given to similar components, and description thereof is omitted as appropriate.

First Example Embodiment

Processing Configuration

Figure 1:
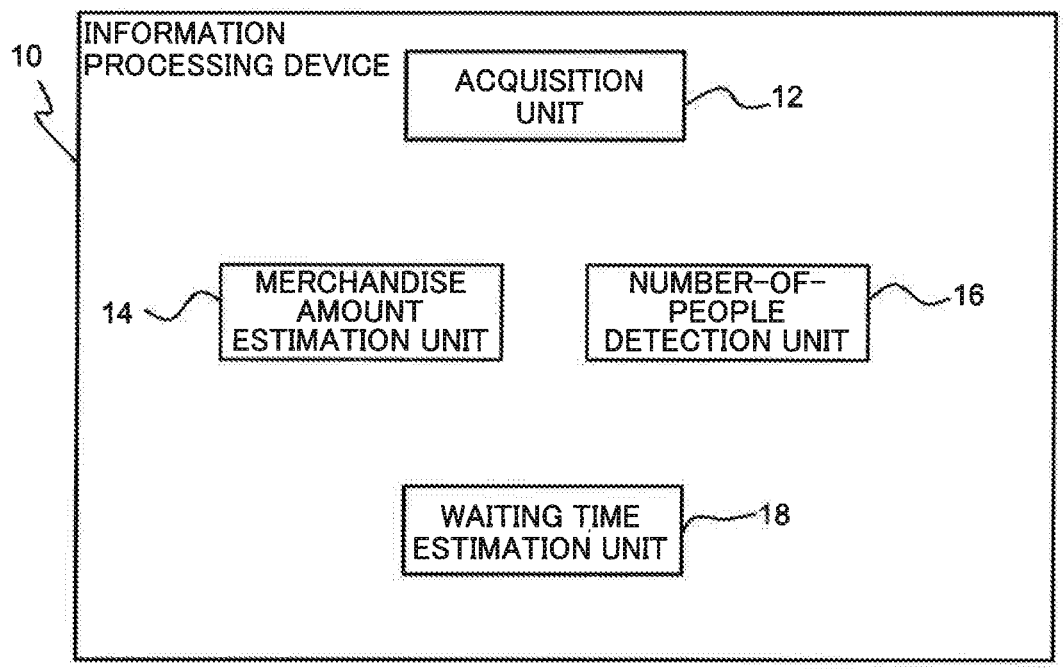
FIG. 1 is a block diagram exemplifying an information processing device according to a first example embodiment.

FIG. 1 is a block diagram exemplifying an information processing device 10 according to a first example embodiment. In the diagram, each block represents a configuration based on a function unit rather than a configuration based on a hardware unit. The information processing device 10 includes a merchandise amount estimation unit 14 (detection means), a number-of-people detection unit 16, and a waiting time estimation unit 18. The merchandise amount estimation unit 14 estimates a merchandise amount of people queuing up for a merchandise registration device (point of sale [POS] device). The number-of-people detection unit 16 detects a number of people queuing up for a merchandise registration device. The waiting time estimation unit 18 calculates a predicted value of a waiting time for each merchandise registration device on the basis of a merchandise amount of people queuing up for the merchandise registration device and the number of people. Details will be described below.

A POS device for which a person queues up for may only have a merchandise registration function, or may have both the merchandise registration function and a checkout function.

The information processing device 10 according to the present example embodiment further includes an acquisition unit 12. The acquisition unit 12 acquires information indicating an image capturing a queue of people queuing up for a merchandise registration device. Then, the merchandise amount estimation unit 14 estimates a total merchandise amount by using the image. The total merchandise amount refers to a merchandise amount of people queuing up for a merchandise registration device, that is, a total amount of merchandise to be registered at the merchandise registration device related to the queue. The "total merchandise amount" may also be hereinafter referred to as an "amount of intra-queue merchandise." Further, even when a total number of a shopping basket is one, the merchandise amount in the shopping basket is referred to as a total merchandise amount or an amount of intra-queue merchandise.

At a store such as a supermarket, a customer selects merchandise to be purchased on a sales floor and then goes to a checkout counter. At the checkout counter, two types of processing being (1) processing of registering merchandise being a checkout target (e.g. barcode reading) and (2) processing of checking out registered merchandise (e.g. receipt of a payment and return of change) are performed. The processing of registering merchandise being a checkout target is performed by a merchandise registration device, and the processing of checking out registered merchandise is performed by a checkout device. A customer may wait for a turn in front of a merchandise registration device for registration and checkout of merchandise.

In an environment in which the information processing device 10 according to the present example embodiment is used, a clerk performs registration with a merchandise registration device, receives a payment or the like from a customer, and performs checkout with a checkout device. When a clerk serves alone, a waiting time for each merchandise registration device may be inferred to be a total sum of time required for merchandise registration and time required for checkout. The time required for merchandise registration may be inferred on the basis of a merchandise amount to be registered, and the time required for checkout may be inferred on the basis of a number of people checking out.

The acquisition unit 12, the merchandise amount estimation unit 14, the number-of-people detection unit 16, and the waiting time estimation unit 18 will be described in detail later.

Hardware Configuration

Figure 2:
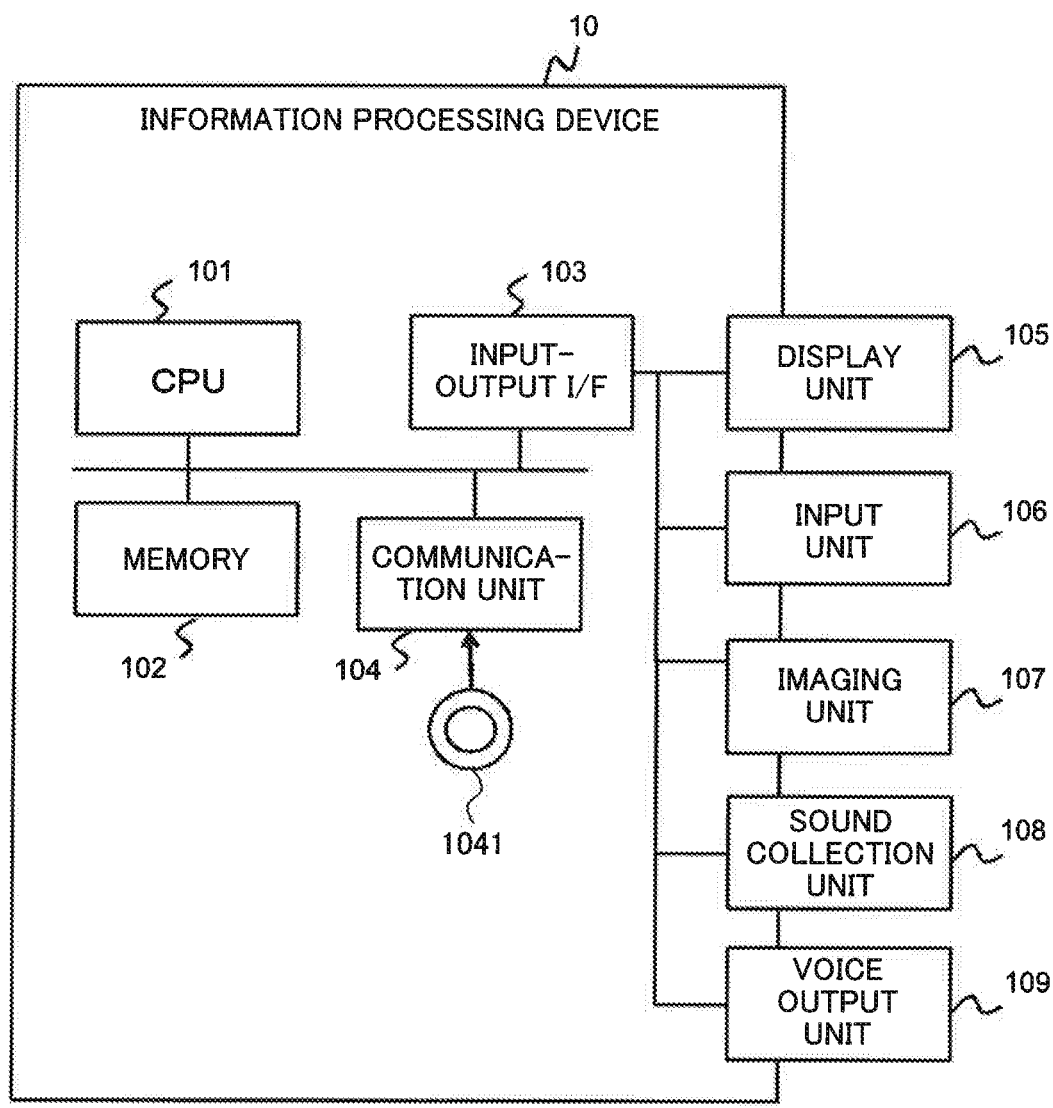
FIG. 2 is a diagram conceptually illustrating a hardware configuration example of the information processing device according to the first example embodiment.

FIG. 2 is a diagram conceptually illustrating a hardware configuration example of the information processing device according to the present example embodiment. As illustrated in the diagram, the information processing device 10 includes a central processing unit (CPU) 101, a memory 102, an input-output interface (I/F) 103, and a communication unit 104. The CPU 101 is connected to each of the other units through a communication line such as a bus. The memory 102 includes a random access memory (RAM), a read only memory (ROM), and a flash memory. The communication unit 104 exchanges a signal with another piece of device or equipment. The communication unit 104 may be connected to a portable recording medium 1041 or the like. The input-output I/F 103 is connected to a display unit 105, an input unit 106, an imaging unit 107, a sound collection unit 108, a voice output unit 109, and the like.

The display unit 105 is a unit displaying a screen related to drawing data processed by the CPU 101, a graphics processing unit (GPU) (unillustrated), or the like, such as a liquid crystal display (LCD) or a cathode ray tube (CRT) display. The input unit 106 is a unit accepting user manipulation input and is provided as, for example, a hardware button unit and a touch sensor. The display unit 105 and the input unit 106 may be integrated and provided as a touch panel. The imaging unit 107 is a camera formed by a lens, an imaging element, and the like, and captures a static image and a dynamic image. The sound collection unit 108 is a microphone unit. The voice output unit 109 includes a speaker unit and a bell.

The hardware configuration of the information processing device 10 is not limited to the configuration illustrated in the diagram. The information processing device 10 may further include a component other than the components illustrated in the diagram. Further, the information processing device 10 may not include the display unit 105, the input unit 106, the imaging unit 107, the sound collection unit 108, and the voice output unit 109. In this case, the information processing device 10 is able to perform display on a display unit 105 included in another device, acquisition of an image captured by an imaging unit 107 in another device, acquisition of voice data obtained by a sound collection unit 108 in another device, and output to a voice output unit 109 in another device, by communication through the communication unit 104.

Operation Example

Figure 3:
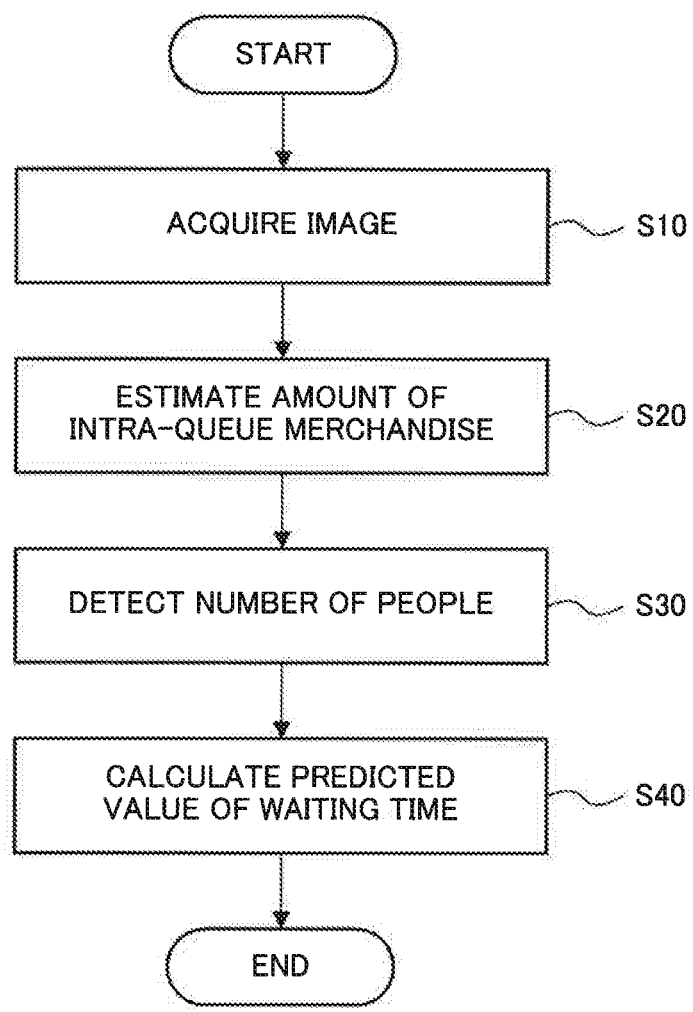
FIG. 3 is a flowchart exemplifying a flow of processing executed by the information processing device according to the first example embodiment.

FIG. 3 is a flowchart exemplifying a flow of processing executed by the information processing device 10 according to the present example embodiment. An information processing method according to the present example embodiment is executed by the information processing device 10 according to the present example embodiment. The information processing method includes Merchandise Amount Estimation Step S20 (detection step), Number-of-people Detection Step S30, and Waiting Time Calculation Step S40. In Merchandise Amount Estimation Step S20, a total merchandise amount of people queuing up for a merchandise registration device is estimated. In Number-of-people Detection Step S30, a number of people queuing up for a merchandise registration device is detected. In Waiting Time Calculation Step S40, a predicted value of a waiting time for each merchandise registration device is calculated on the basis of a total merchandise amount and the number of people. An order of Number-of-people Detection Step S30 and Merchandise Amount Estimation Step S20 is not considered relevant.

The information processing method according to the present example embodiment further includes Acquisition Step S10. In Acquisition Step S10, information indicating an image capturing a queue of people queuing up for a merchandise registration device is acquired. Then, in Merchandise Amount Estimation Step S20 a total merchandise amount is estimated by using the image. The image is transmitted in response to a predetermined manipulation (manipulation to be a trigger for acquiring information) in the information processing device 10 and may be acquired by the acquisition unit 12.

The acquisition unit 12, the merchandise amount estimation unit 14, the number-of-people detection unit 16, and the waiting time estimation unit 18 will be described below including details.

The acquisition unit 12 acquires, from the imaging unit 107, information indicating an image capturing a queue of people queuing up for a merchandise registration device (Acquisition Step S10). In order to capture a queue, the imaging unit 107 is provided, for example, on the ceiling roughly above the merchandise registration device 20 and captures the queue of customers from above.

Figure 4:
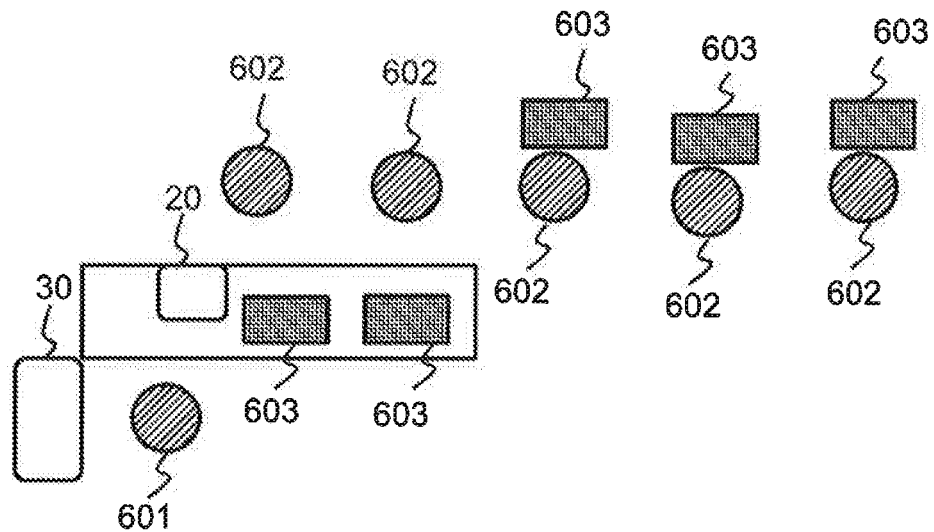
FIG. 4 is a diagram illustrating an example of an image information of which is acquired by an acquisition unit according to the first example embodiment.

FIG. 4 is a diagram illustrating an example of an image information of which is acquired by the acquisition unit 12 according to the present example embodiment. A clerk 601 is placed for the merchandise registration device 20 and the checkout device 30, and performs processing. A plurality of customers 602 wait for turns in front of the merchandise registration device 20 and form a queue. Each customer 602 holds a shopping basket 603. Then, merchandise (unillustrated) to be purchased by each customer 602 is put in each shopping basket 603.

While the diagram illustrates an example of a plurality of shopping baskets 603 and customers 602 forming a queue, a number of shopping baskets 603 queuing up for the merchandise registration device 20 may be zero or one. Further, a number of customers 602 queuing up for the merchandise registration device 20 may be zero or one. Further, a plurality of customers 602 may queue up with a total number of a shopping basket 603 being one. The term "queue" is used in all cases.

Returning to FIG. 1, the merchandise amount estimation unit 14 according to the present example embodiment estimates an amount of intra-queue merchandise on the basis of information indicating an image acquired by the acquisition unit 12.

Figure 5:
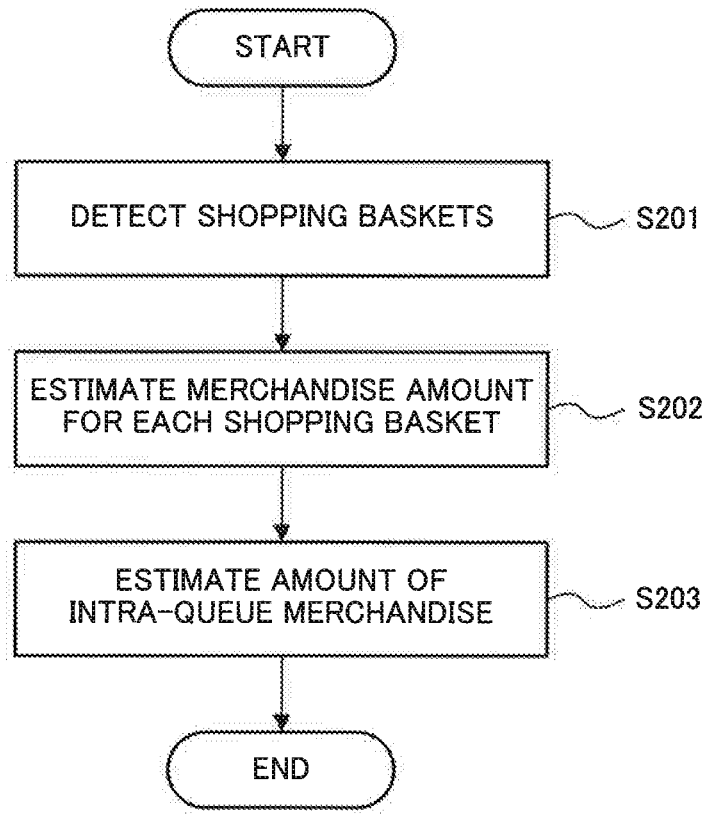
FIG. 5 is a flowchart exemplifying a flow of a merchandise amount estimation step executed by a merchandise amount estimation unit according to the first example embodiment.

FIG. 5 is a flowchart exemplifying a flow of Merchandise Amount Estimation Step S20 executed by the merchandise amount estimation unit 14 according to the present example embodiment. The merchandise amount estimation unit 14 according to the present example embodiment detects shopping baskets 603 in a predetermined area in the image (Step S201). Next, the merchandise amount estimation unit 14 estimates a merchandise amount for each shopping basket 603 (Step S202). Then, the merchandise amount estimation unit 14 estimates an amount of intra-queue merchandise by adding up the estimated merchandise amounts for the respective shopping baskets 603 (Step S203). Each step will be described below.

In Step S201, the merchandise amount estimation unit 14 detects shopping baskets 603 included in the predetermined area in the image. For example, the predetermined area may be an entire image or may be an area in the image in which a queue for the merchandise registration device 20 is anticipated to be formed. The merchandise amount estimation unit 14 previously holds a feature value for extracting a shopping basket 603 by image recognition. Then, by matching processing using the feature value, the merchandise amount estimation unit 14 detects a shopping basket 603 from the predetermined area in the image.

In Step S202, the merchandise amount estimation unit 14 estimates a merchandise amount for each shopping basket 603. The merchandise amount estimation unit 14 according to the present example embodiment detects, from the image, a height of contents in each shopping basket 603 and estimates a merchandise amount for each shopping basket 603 by using the detected height of the contents. The height of the contents is a height from the bottom of the shopping basket 603. For example, the merchandise amount estimation unit 14 according to the present example embodiment may estimate a merchandise amount for each shopping basket by either a method 1 or a method 2 described below.

Method 1

On the basis of an image, the merchandise amount estimation unit 14 detects, for each shopping basket 603 detected in Step S201, positions of a top edge of a shopping basket 603 and a top surface of the contents put in the shopping basket 603. Then, on the basis of the positions, the merchandise amount estimation unit 14 detects a positional relation and a distance between the top edge and the top surface. The distance between the top edge and the top surface may be detected as follows. On the basis of a position of the shopping basket 603 in the image, the merchandise amount estimation unit 14 detects a distance from the imaging unit 107 to the shopping basket 603. Then, according to the distance from the imaging unit 107 to the shopping basket 603, the merchandise amount estimation unit 14 converts a reduced scale of the distance between the top edge and the top surface in the image and calculates an actual distance between the top edge and the top surface.

In the method, on the basis of the positional relation and the distance between the top edge and the top surface, the merchandise amount estimation unit 14 decides which stage the height of the contents put in the shopping basket 603 corresponds to, out of a plurality of predetermined stages. When the top surface of the contents is positioned lower than the top edge of the shopping basket 603, an amount of the contents in the shopping basket 603 may be inferred to become less as the distance between the top surface and the top edge becomes greater. On the other hand, when the top surface of the contents is positioned higher than the top edge of the shopping basket 603, an amount of the contents in the shopping basket 603 may be inferred to become greater as the distance between the top surface and the top edge becomes greater.

Each stage is associated with an average value of a number of pieces of merchandise when a merchandise amount is decided to correspond to the stage. Then, the merchandise amount estimation unit 14 estimates the average value of a number of pieces of merchandise corresponding to the decided stage as the number of pieces of merchandise in the shopping basket 603.

Without being limited by the aforementioned method, the height of the contents may be acquired by detecting a height from the bottom of the shopping basket 603 to the top surface of the contents put in the shopping basket 603.

Method 2

In this method, the merchandise amount estimation unit 14 detects a number of pieces of merchandise in a top layer in each shopping basket 603 from an image. For example, the merchandise amount estimation unit 14 extracts an outline of merchandise in an image of a shopping basket 603 and detects a number of pieces of merchandise in the top layer.

Further, similarly to the method 1, the merchandise amount estimation unit 14 detects a height of the contents in the shopping basket 603. Then, the merchandise amount estimation unit 14 estimates a merchandise amount for each shopping basket 603 by using the height of the contents and the number of pieces of merchandise in the top layer.

Specifically, on the basis of a positional relation and a distance between the top edge and the top surface, the merchandise amount estimation unit 14 decides which stage the height of the contents put in the shopping basket 603 corresponds to, out of a plurality of predetermined stages. Each stage is associated with an average value of a number of layers of merchandise when a merchandise amount is decided to correspond to the stage. Then, the merchandise amount estimation unit 14 estimates the average value of a number of layers of merchandise corresponding to the decided stage as the number of layers of merchandise in the shopping basket 603.

Next, the merchandise amount estimation unit 14 estimates a value obtained by multiplying the estimated number of layers of merchandise by the number of pieces of merchandise in the top layer as the number of pieces of merchandise in the shopping basket 603.

In the method 2, the merchandise amount estimation unit 14 may previously hold a specific value as a number of pieces of merchandise per layer instead of detecting a number of pieces of merchandise in the top layer. In that case, the number of pieces of merchandise in the shopping basket 603 may be estimated by multiplying the number of pieces of merchandise by the number of layers of merchandise.

Furthermore, a length of a reference queue determining a range in which a number of pieces of merchandise in the top layer in a shopping basket 603 can be detected may be predetermined, and the merchandise amount estimation unit 14 may change the estimation method at the length. For example, the merchandise amount estimation unit 14 may use the method 2 only for shopping baskets 603 within the reference length and use the method 1 for shopping baskets 603 beyond the reference length.

Furthermore, in addition to the imaging unit 107 for capturing the aforementioned queue, at least one of an imaging unit 107 for capturing a shopping basket 603 from a lateral direction in order to detect a height of a contents and an imaging unit 107 for capturing a shopping basket 603 in a magnified manner in order to detect the top layer of the shopping basket 603 may be further provided.

As described above, the merchandise amount estimation unit 14 estimates an amount of intra-queue merchandise by adding up the estimated merchandise amounts for the respective shopping baskets 603 (Step S203). When the aforementioned method 1 or method 2 is used, the merchandise amount estimation unit 14 estimates a number of pieces of merchandise in the queue as the merchandise amount by adding up the estimated numbers of pieces of merchandise for the respective shopping baskets 603.

Returning to FIG. 3, the number-of-people detection unit 16 detects a number of people included in the image. Specifically, the number-of-people detection unit 16 previously holds a feature value for extracting a person by image recognition. Then, by matching processing using the feature value, the number-of-people detection unit 16 assumes and detects, for example, people in a specific area as people forming a queue for a merchandise registration device 20. Then, the number-of-people detection unit 16 calculates a detected number of people.

The method of the number-of-people detection unit 16 detecting a number of people is not limited to such a method using an image. In place of the method, for example, the number-of-people detection unit 16 may detect a length of a queue and estimate a number of people, from a detection result by a plurality of sensors provided on the floor along a place where a queue is formed. For example, the sensor is a pressure sensor or a photo-detection sensor. When a pressure detected by a pressure sensor is greater than a predetermined reference value, it may be determined that a queue is formed in the area where the pressure sensor is placed. Alternatively, when an amount of light detected by a photo-detection sensor is less than a predetermined reference value, it may be determined that a queue is formed in the area. The number-of-people detection unit 16 acquires data associating a length of a queue with a number of people from a memory and, on the basis of the data, estimates a number of people related to the detected length of the queue as the number of people queuing up for a merchandise registration device 20.

Alternatively, the number-of-people detection unit 16 may infer the number of people by reading information of a radio frequency identification (RFID) tag provided on a shopping basket, a cart, a membership card, or the like held by a person in the queue. Specifically, a plurality of RFID readers are provided along a place where a queue is formed, and, from an RFID tag approaching within a predetermined range, an RFID reader acquires information indicating an identification number assigned to the tag. Then, the number-of-people detection unit 16 detects a number of RFID tags from which the RFID readers acquire identification numbers as the number of people queuing up for the merchandise registration device 20.

Further, an RFID reader is provided in the vicinity of a place where a merchandise-registered shopping basket or a person completing merchandise registration passes, and, when a merchandise-registered shopping basket or a person approaches within a predetermined range of the RFID reader, the RFID reader acquires information indicating an identification number from the RFID tag. Then, the number-of-people detection unit 16 assumes that the person corresponding to the acquired identification number disappears from the queue and subtracts the person from an estimated number of people. Thus, a number of people completing merchandise registration is excluded from the estimated number of people in the queue. Instead of or in addition to using the RFID reader, the checkout device 30 may assume that a person corresponding to an identification number acquired by reading a membership card presented at the time of checkout disappears from the queue and exclude the person from the number of people.

On the basis of the estimated amount of intra-queue merchandise and the detection result of the number-of-people detection unit 16, the waiting time estimation unit 18 calculates a predicted value of a waiting time for each merchandise registration device 20.

Figure 6:
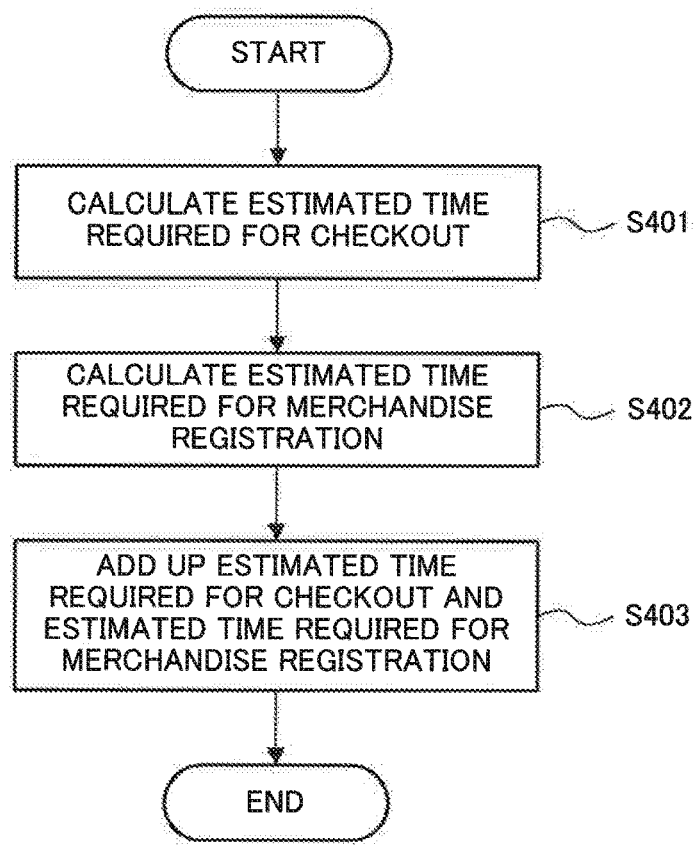
FIG. 6 is a flowchart exemplifying a flow of a waiting time calculation step executed by a waiting time estimation unit according to the first example embodiment.

FIG. 6 is a flowchart exemplifying a flow of Waiting Time Calculation Step S40 executed by the waiting time estimation unit 18 according to the present example embodiment. The waiting time estimation unit 18 calculates a time obtained by multiplying the number of people detected by the number-of-people detection unit 16 by an average value of time required for each checkout as estimated time required for checkout (Step S401). Further, the waiting time estimation unit 18 calculates a time obtained by multiplying the number of intra-queue pieces of merchandise estimated by the merchandise amount estimation unit 14 by an average value of time required for registration of each piece of merchandise as estimated time required for merchandise registration (Step S402).

Then, the waiting time estimation unit 18 calculates a value obtained by adding up the calculated estimated time required for checkout and the calculated estimated time required for merchandise registration as a predicted value of a waiting time for each merchandise registration device 20 (Step S403). The order of Step S401 and Step S402 is not considered relevant.

With regard to an average value of the time required for each checkout and an average value of the time required for registration of each piece of merchandise, the waiting time estimation unit 18 may read and use values previously obtained and held in the memory 102 or the like.

The average value of the time required for each checkout and the average value of the time required for registration of each piece of merchandise may vary by a skill level of a clerk. Accordingly, the average values may be associated with each clerk performing registration and checkout of merchandise and be held in the memory 102 or the like. In that case, a clerk registers a name, an identification (ID), or the like of the clerk in the information processing device 10, when placed at a checkout counter. Then, the waiting time estimation unit 18 may read and use the average values related to the clerk being placed.

The average value of the time required for each checkout and the average value of the time required for registration of each piece of merchandise may be updated on the basis of an actual processing time by a clerk. Thus, more accurate information about a waiting time can be provided for a customer.

The method of updating an average value of time required for each checkout will be described below. The time required for each checkout may be defined as a time elapsed from a time when every piece of merchandise of a customer is registered and processing for finalizing a charge is performed (e.g. when a finalization key on the merchandise registration device 20 is manipulated) to a time when change and a receipt are both provided. Then, the waiting time estimation unit 18 calculates an average value for most recent predetermined number of checkouts or within a predetermined time period as the average value of the time required for each checkout. Then, the waiting time estimation unit 18 replaces an average value already held in the memory 102 or the like with the average value and uses the latest average value the next time the unit calculates a predicted value of a waiting time.

The method of updating an average value of time required for registration of each piece of merchandise will be described below. Subsequently to completion of a checkout of a previous customer (e.g. after change and a receipt are both provided), a time elapsed from a time when a first piece of merchandise is registered in the merchandise registration device 20 to a time when a last piece of a customer's merchandise is registered and processing for finalizing a charge is performed is assumed to be time for one turn of merchandise registration. Furthermore, a time obtained by adding a predetermined specific additional time to the above may be assumed as the time for one turn. The additional time corresponds to a time elapsed from a time when a first piece of merchandise is picked up from a shopping basket to a time when the piece of merchandise is registered, and, for example, an average value of the time being pre-surveyed may be used, and the time held in the memory 102 or the like may be read and acquired by the waiting time estimation unit 18.

Further, a number of merchandise from the first piece of merchandise to the last piece of merchandise, being registered in each turn, is called a number of pieces of merchandise of the turn. The waiting time estimation unit 18 acquires a time and a number of pieces of merchandise of each turn and adds up the times and the numbers of pieces of merchandise of all turns in most recent predetermined number of turns or within a predetermined time, respectively, and, by dividing the resulting time by the resulting number of pieces of merchandise, calculates an average value of time required for registration of each piece of merchandise. Then, the waiting time estimation unit 18 replaces an average value held in the memory 102 or the like with the average value and uses the latest average value the next time the unit calculates a predicted value of a waiting time.

The waiting time estimation unit 18 may acquire a time and a number of pieces of merchandise of each turn, calculate average values for each turn, and then calculate an average of the average values of all turns in most recent predetermined number of turns or within a predetermined time, and assume the resulting average to be an average value of time required for registration of each piece of merchandise.

The predicted value of a waiting time calculated by the waiting time estimation unit 18 is displayed on a display unit for customers for each merchandise registration device 20 in such a way that a customer is able to see the value. For example, the display may be any of a character display such as "WAITING TIME OF THIS CHECKOUT COUNTER IS X MINUTES," light emission changing colors depending on a length of a predicted waiting time, display of an indicator or a symbol based on a length of a waiting time, and the like.

A customer is able to smoothly perform registration and checkout of merchandise by checking the display and queuing up for a merchandise registration device 20 with a shorter anticipated waiting time.

A merchandise amount estimated by the merchandise amount estimation unit 14 is not limited to a number of pieces of merchandise and may be a merchandise volume. When the merchandise amount estimation unit 14 estimates a merchandise volume, the waiting time estimation unit 18 acquires data indicating a relation between a range of a merchandise volume and time required for registration processing, the data being previously held in the memory 102 or the like. Then, the waiting time estimation unit 18 acquires, in the data, time related to a range corresponding to the volume estimated by the merchandise amount estimation unit 14 and assumes the time as estimated time required for merchandise registration. Subsequently, as described above, the waiting time estimation unit 18 performs Step S403 and calculates a predicted value of a waiting time. The data indicating a relation between a range of a merchandise volume and time required for registration processing may be generated by pre-surveying average values of a merchandise volume and time required for the processing, and be held in the memory 102 or the like.

The calculated predicted value of a waiting time may be held in the memory 102 or the like and be used for customer trend analysis and the like.

The shopping basket is not limited to a basket shape and may be a cart or the like into which merchandise is directly put.

In the information processing device 10, the aforementioned information processing method is executed at every preset specific time, at which a new predicted value of a waiting time is calculated and display for customers is updated.

Next, an operation and effect of the present example embodiment will be described. The information processing device 10 and the information processing method, according to the present example embodiment, are able to provide a customer with information about a waiting time. Consequently, the customer is able to finish shopping comfortably. Further, alleviation of congestion and enhanced work efficiency can be provided by customers spreading over respective merchandise registration devices 20 and checkout processing at the store progressing smoothly.

Second Example Embodiment

Figure 7:
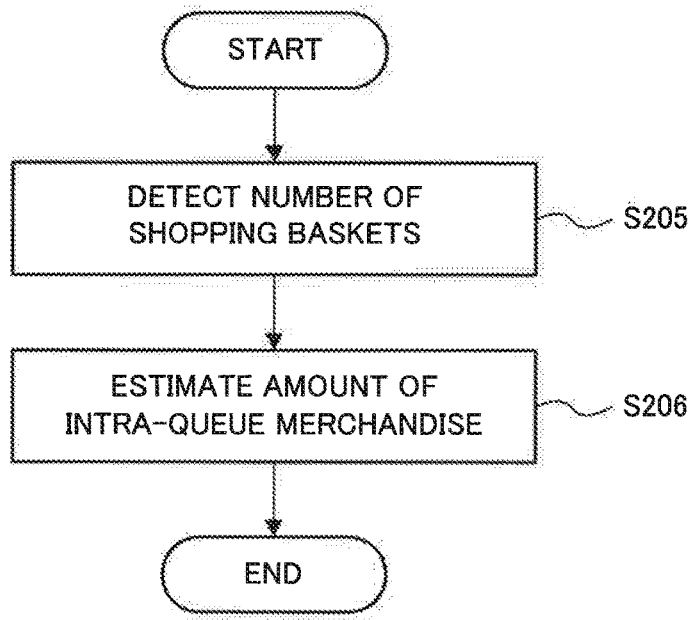
FIG. 7 is a flowchart exemplifying a flow of a merchandise amount estimation step executed by a merchandise amount estimation unit according to a second example embodiment.

FIG. 7 is a flowchart exemplifying a flow of Merchandise Amount Estimation Step S20 executed by a merchandise amount estimation unit 14 according to a second example embodiment. An information processing device 10 according to the present example embodiment is the same as the information processing device 10 according to the first example embodiment except for processing in Merchandise Amount Estimation Step S20 executed by the merchandise amount estimation unit 14.

Figure 8:
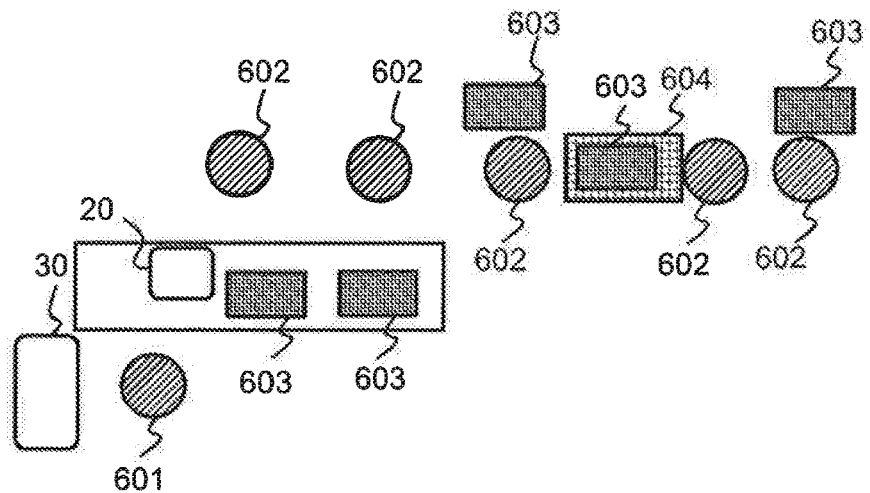
FIG. 8 is a diagram illustrating an example of an image information of which is acquired by an acquisition unit according to the second example embodiment.

FIG. 8 is a diagram illustrating an example of an image information of which is acquired by an acquisition unit 12 according to the present example embodiment. The diagram corresponds to FIG. 4 according to the first example embodiment.

The merchandise amount estimation unit 14 according to the present example embodiment detects a number of shopping baskets 603 included in a predetermined area in an image (Step S205). Then, the merchandise amount estimation unit 14 estimates an amount of intra-queue merchandise by using the detected number of shopping baskets 603 (Step S206). Each Step will be described below.

In Step S205, the merchandise amount estimation unit 14 detects shopping baskets 603 included in the predetermined area in the image. For example, the predetermined area may be an entire image or may be an area in the image in which a queue for the merchandise registration device 20 is anticipated to be formed. The merchandise amount estimation unit 14 previously holds a feature value for extracting a shopping basket 603 by image recognition. Then, by matching processing using the feature value, the merchandise amount estimation unit 14 detects a number of shopping baskets 603 in the predetermined area in the image.

In Step S206, the merchandise amount estimation unit 14 estimates an number of intra-queue pieces of merchandise obtained by multiplying the detected number of shopping baskets 603 by an average number of pieces of merchandise in a shopping basket 603 as a merchandise amount in the queue. With regard to the average number of pieces of merchandise in a shopping basket 603, an average number of pieces of merchandise per shopping basket 603 purchased by a customer 602 shopping using a shopping basket 603 may be pre-surveyed and held in a memory 102 or the like. The merchandise amount estimation unit 14 may read, acquire, and use the average number.

The same holds for an average number of pieces of merchandise in a cart 604 to be described later.

Further, as illustrated in FIG. 8, some customer 602 may use a cart 604 on which a shopping basket 603 is placed. For example, two shopping-basket-mounting units arranged in a vertical direction are provided on a cart 604. Then, a cart placed in the lower tier is not likely to appear in an image captured from above.

Accordingly, the merchandise amount estimation unit 14 according to the present example embodiment may detect a number of shopping baskets 603 and a number of carts 604 in a predetermined area in an image and estimate an amount of intra-queue merchandise by using the detected number of shopping baskets 603 and the detected number of carts 604.

In this case, in Step S205, the merchandise amount estimation unit 14 previously holds feature values for extracting, by image recognition, a shopping basket 603 and a cart 604, respectively. Then, by matching processing using the feature values, the merchandise amount estimation unit 14 detects a number of shopping baskets 603 and a number of carts 604 from the predetermined area in the image. In this case, a shopping basket 603 placed in the upper tier of a cart 604 is included in the number of shopping baskets 603. On the other hand, a shopping basket 603 placed in the lower tier of a cart 604 is not detected.

In Step S206, the merchandise amount estimation unit 14 calculates a first number of pieces of merchandise obtained by multiplying a number of shopping baskets 603 not placed on carts 604 by an average number of pieces of merchandise in a shopping basket 603. The number of shopping baskets 603 not placed on carts 604 is obtained by subtracting the number of carts 604 from the detected number of shopping baskets 603. Further, the merchandise amount estimation unit 14 calculates a second number of pieces of merchandise obtained by multiplying twice the number of the detected carts 604 by an average number of pieces of merchandise in a shopping basket 603. Then, the merchandise amount estimation unit 14 estimates an number of intra-queue pieces of merchandise obtained by adding up the first number of pieces of merchandise and the second number of pieces of merchandise as a merchandise amount in the queue. In this method, it is assumed that two shopping baskets 603 are placed on each cart 604.

When using a cart 604, a customer 602 does not need to move around in the store carrying a heavy thing, and therefore it may be considered that a number of pieces of merchandise per shopping basket 603 increases. Accordingly, the merchandise amount estimation unit 14 may calculate a second number of pieces of merchandise by using a larger value as an average number of pieces of merchandise in a shopping basket 603 when shopping using a cart 604 compared with a case of shopping without using a cart 604.

In a case that a cart 604 is not equipped with a shopping basket 603 and merchandise is directly put into the cart, Merchandise Amount Estimation Step S20 may be performed as follows. The memory 102 or the like previously stores an average number of pieces of merchandise in a shopping basket 603 and an average number of pieces of merchandise in a cart 604. The average number of pieces of merchandise in a cart 604 is greater than the average number of pieces of merchandise in a shopping basket 603. In Merchandise Amount Estimation Step S20, the merchandise amount estimation unit 14 detects respective numbers of shopping baskets 603 and carts 604. Further, the merchandise amount estimation unit 14 reads the average number of pieces of merchandise in a shopping basket 603 and the average number of pieces of merchandise in a cart 604 from the memory 102 or the like. Then, the merchandise amount estimation unit 14 estimates a value obtained by adding up a value obtained by multiplying a number of shopping baskets 603 by the average number of pieces of merchandise in a shopping basket 603 and a value obtained by multiplying a number of carts 604 by the average number of pieces of merchandise in a cart 604 as an number of intra-queue pieces of merchandise.

Furthermore, a length of a reference queue may be predetermined, and the merchandise amount estimation unit 14 may change the estimation method of a merchandise amount at the length. For example, the merchandise amount estimation unit 14 may estimate a number of pieces of merchandise in each shopping basket 603 by the method according to the first example embodiment for shopping baskets 603 positioned within the reference length and may use the method according to the present example embodiment using an average number of pieces of merchandise for shopping baskets 603 positioned beyond the reference length.

Next, an operation and effect of the present example embodiment will be described. The present example embodiment provides the same operation and effect as the first example embodiment. In addition, there is no need to detect a merchandise amount for each shopping basket 603 by image recognition, and therefore a processing load in the merchandise amount estimation unit 14 can be reduced.

Third Example Embodiment

Figure 9:
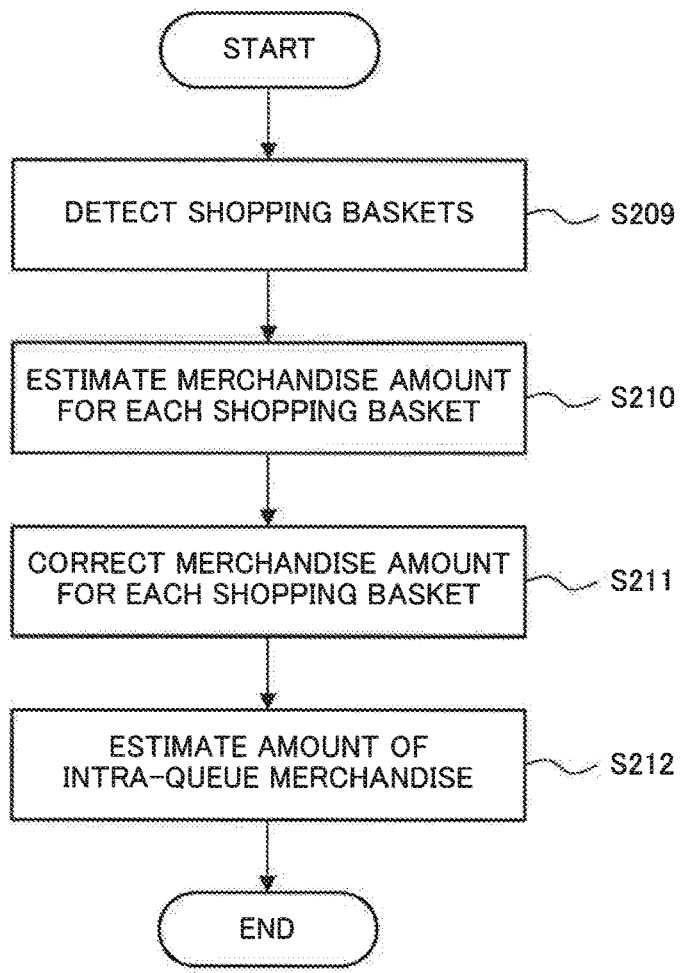
FIG. 9 is a flowchart exemplifying a flow of a merchandise amount estimation step executed by a merchandise amount estimation unit according to a third example embodiment.

FIG. 9 is a flowchart exemplifying a flow of Merchandise Amount Estimation Step S20 executed by a merchandise amount estimation unit 14 according to a third example embodiment. An information processing device 10 according to the present example embodiment is the same as the information processing device 10 according to the first example embodiment except for processing in Merchandise Amount Estimation Step S20 executed by the merchandise amount estimation unit 14 and an acquisition unit 12 further acquiring information indicating a weight of a shopping basket 603 in Acquisition Step S10.

Figure 10:
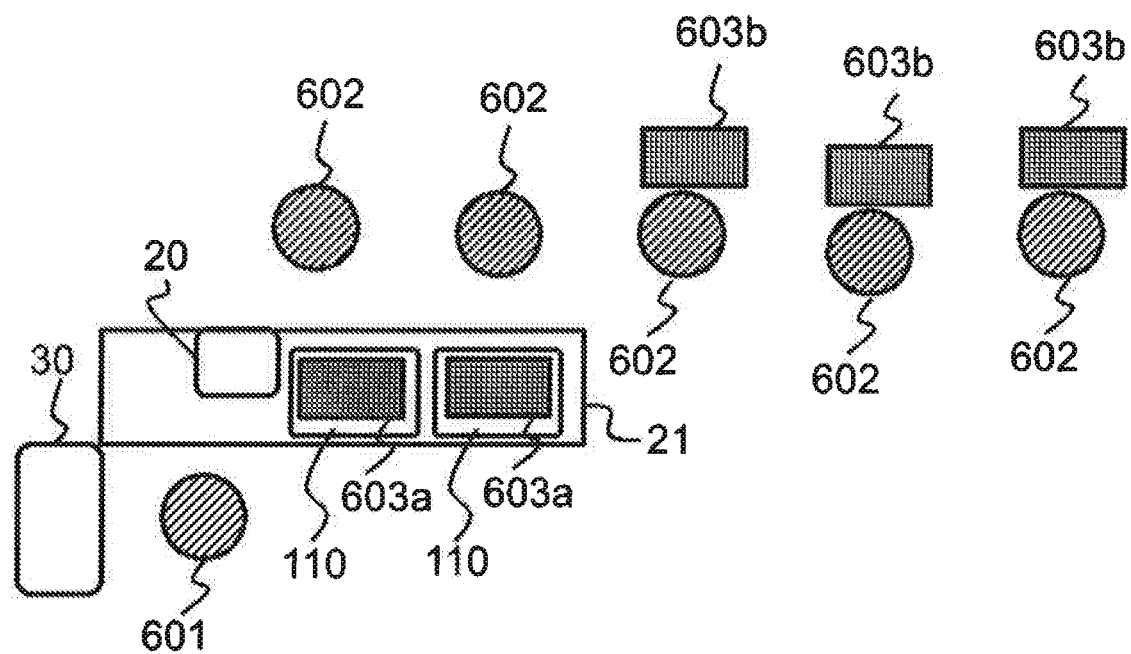
FIG. 10 is a diagram illustrating an example of an image information of which is acquired by an acquisition unit according to the third example embodiment.

FIG. 10 is a diagram illustrating an example of an image information of which is acquired by the acquisition unit 12 according to the present example embodiment. The diagram corresponds to FIG. 4 according to the first example embodiment. In a queue for a merchandise registration device 20, shopping baskets 603*a* of first several people are placed on a counter 21 on which shopping baskets 603 that are not yet merchandise-registered are put. A weight of each shopping basket 603*a* is measured by a weight measurement unit 110 provided on the counter 21. The measured weight is used for correction of a merchandise amount in each shopping basket 603*a*.

The merchandise amount estimation unit 14 according to the present example embodiment corrects a merchandise amount in a shopping basket 603*a* by using the weight of the shopping basket 603a measured by the weight measurement unit 110 provided in the merchandise registration device 20.

Hardware Configuration

Figure 11:
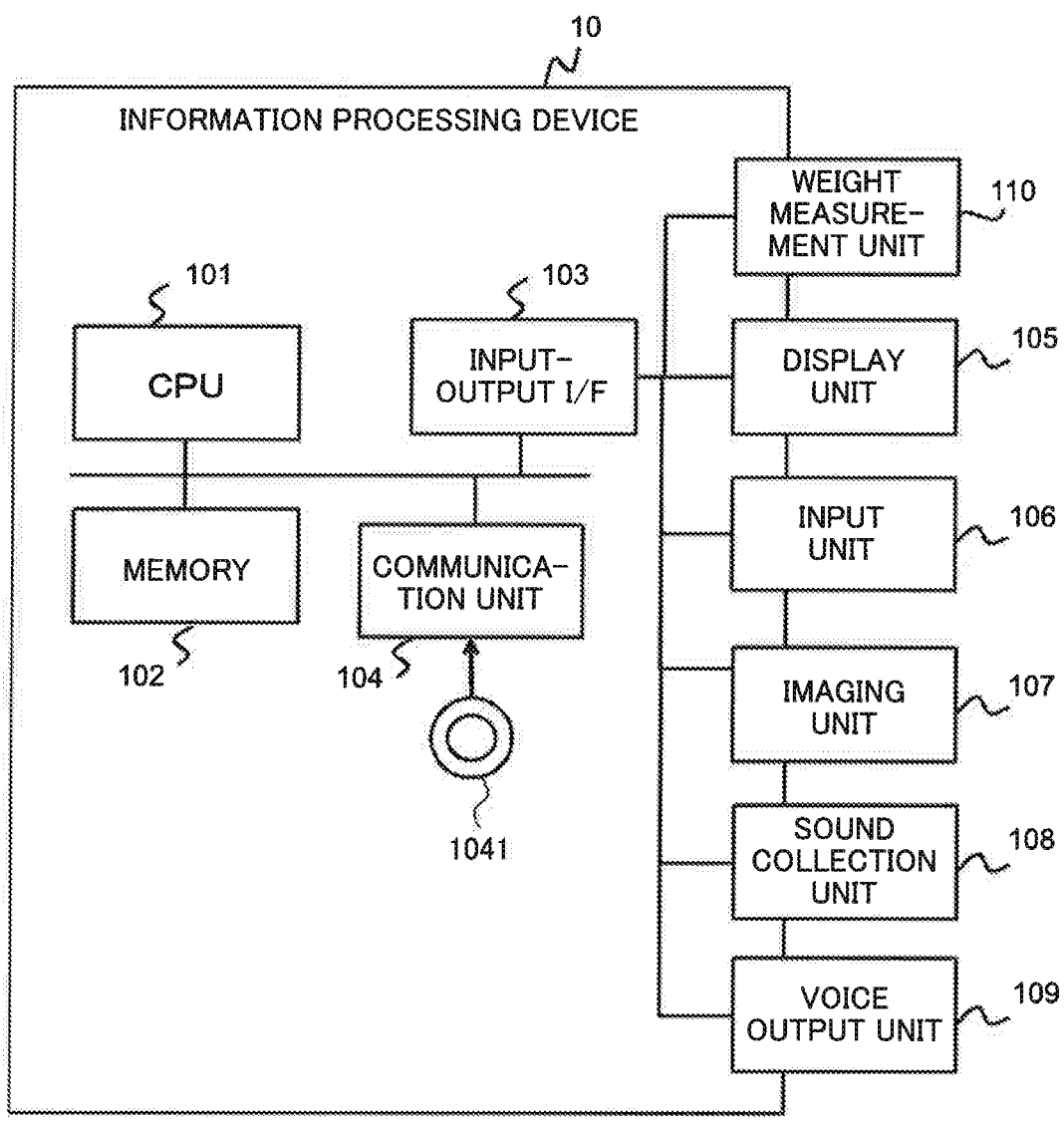
FIG. 11 is a diagram conceptually illustrating a hardware configuration example of an information processing device according to the third example embodiment.

FIG. 11 is a diagram conceptually illustrating a hardware configuration example of the information processing device 10 according to the present example embodiment. The hardware configuration example of the information processing device 10 according to the present example embodiment is the same as the hardware configuration example of the information processing device 10 according to the first example embodiment except for including the weight measurement unit 110. As illustrated in the diagram, the weight measurement unit 110 is connected to an input-output I/F 103. The weight measurement unit 110 is a scale or the like. Similarly to the first example embodiment, the hardware configuration of the information processing device 10 is not limited to the configuration illustrated in the diagram. When the information processing device 10 does not include the weight measurement unit 110, the information processing device 10 may acquire information indicating a weight obtained by a weight measurement unit 110 included in another device, by communication through a communication unit 104.

Operation Example

Returning to FIG. 9, an operation example of the information processing device 10 according to the present example embodiment will be described. The acquisition unit 12 according to the present example embodiment further acquires from the weight measurement unit 110 information indicating a weight of each shopping basket 603a placed on the counter 21. Similarly to the method according to the first example embodiment, the merchandise amount estimation unit 14 according to the present example embodiment detects shopping baskets 603 (Step S209) and estimates a merchandise amount (number of pieces of merchandise) for each shopping basket 603 (Step S210). Then, the merchandise amount estimation unit 14 corrects a number of pieces of merchandise in each shopping basket 603a by using the information indicating the weight acquired by the acquisition unit 12 (Step S211).

Specifically, the correction is performed as follows. The memory 102 or the like previously holds an upper limit and a lower limit of a reference weight for each number of pieces of merchandise. The merchandise amount estimation unit 14 reads and acquires the upper limit and the lower limit. Then, the merchandise amount estimation unit 14 decides whether or not an upper limit related to a number of pieces of merchandise estimated in Step S210 is less than the acquired weight of the shopping basket 603a. When the upper limit is decided to be less than the acquired weight, the merchandise amount estimation unit 14 makes a correction in such a way that the number of pieces of merchandise in the shopping basket 603a is decreased by a predetermined ratio with respect to the estimated number of pieces of merchandise.

On the other hand, when the upper limit is decided to be greater than or equal to the acquired weight, the merchandise amount estimation unit 14 subsequently decides whether or not a lower limit related to the number of pieces of merchandise estimated in Step S210 is greater than the acquired weight of the shopping basket 603a. When the lower limit is decided to be greater than the acquired weight, the merchandise amount estimation unit 14 makes a correction in such a way that the number of pieces of merchandise in the shopping basket 603a is increased by a predetermined ratio with respect to the estimated number of pieces of merchandise. When the lower limit is decided to be less than or equal to the acquired weight, the merchandise amount estimation unit 14 does not make a correction.

Further, a correction is not made with respect to a shopping basket 603b not placed on the counter 21.

Next, the merchandise amount estimation unit 14 estimates an number of intra-queue pieces of merchandise obtained by adding up a number of pieces of merchandise in a shopping basket 603a undergoing Step S211 and a number of pieces of merchandise in a shopping basket 603b for every shopping basket 603 in the queue as a merchandise amount in the queue (Step S212).

While an example of the merchandise amount estimation unit 14 according to the present example embodiment detecting a shopping basket 603 and estimating a merchandise amount (number of pieces of merchandise) for each shopping basket 603, similarly to Steps S201 and S202 according to the first example embodiment, has been described above, the present example embodiment is not limited to the above. The correction according to the present example embodiment may be applied to the method according to the second example embodiment. In this case, the merchandise amount estimation unit 14 detects a number of shopping baskets 603a on the counter 21 and a number of shopping baskets 603b not placed on the counter 21, respectively. Then, with respect to a shopping basket 603a, the merchandise amount estimation unit 14 may apply an average number of pieces of merchandise corrected similarly to the aforementioned method, by using a weight of the shopping basket 603a measured by the weight measurement unit 110, and with respect to a shopping basket 603b, the merchandise amount estimation unit 14 may apply an uncorrected average number of pieces of merchandise.

Next, an operation and effect of the present example embodiment will be described. The present example embodiment provides the same operation and effect as the first example embodiment. In addition, the present example embodiment is able to predict a waiting time more accurately.

Fourth Example Embodiment

Figure 12:
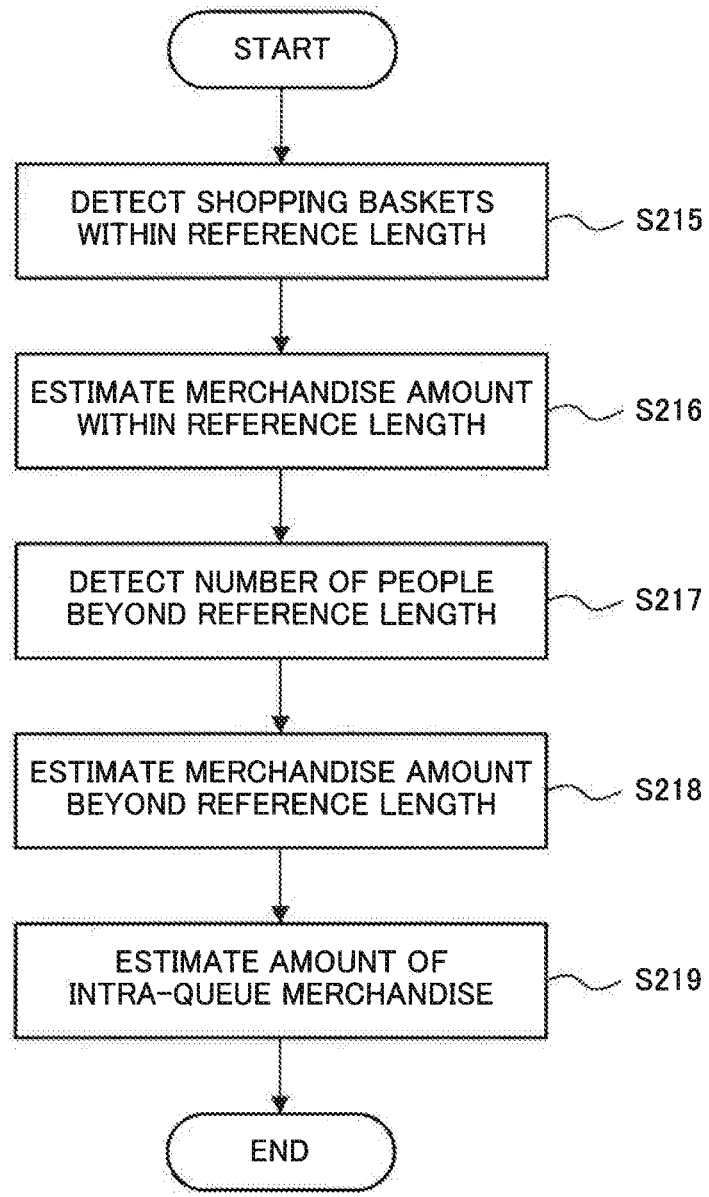
FIG. 12 is a flowchart exemplifying a flow of a merchandise amount estimation step executed by a merchandise amount estimation unit according to a fourth example embodiment.

FIG. 12 is a flowchart exemplifying a flow of Merchandise Amount Estimation Step S20 executed by a merchandise amount estimation unit 14 according to the present example embodiment. An information processing device 10 according to the present example embodiment is the same as the information processing device 10 according to the first example embodiment except for processing in Merchandise Amount Estimation Step S20 executed by the merchandise amount estimation unit 14.

Figure 13:
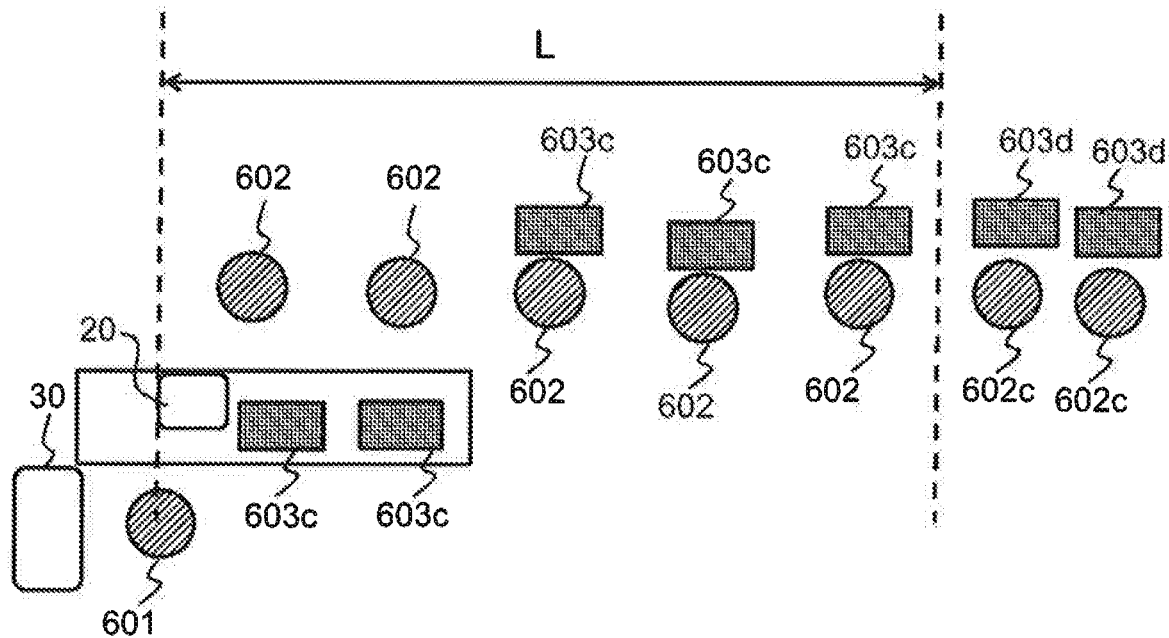
FIG. 13 is a diagram illustrating an example of an image information of which is acquired by an acquisition unit according to the fourth example embodiment.

FIG. 13 is a diagram illustrating an example of an image information of which is acquired by an acquisition unit 12 according to the present example embodiment. The diagram corresponds to FIG. 4 according to the first example embodiment. When a queue for a merchandise registration device 20 is long, an object in an image acquired by the imaging unit 107 may become more unclear as the object becomes closer to the rear end of the queue.

The merchandise amount estimation unit 14 according to the present example embodiment does not detect a shopping basket 603d beyond a predetermined reference length L of a queue of people queuing up for a merchandise registration device 20, in an image. The merchandise amount estimation unit 14 estimates a merchandise amount beyond the reference length L on the basis of a number of people beyond the reference length L.

Using FIG. 12, an operation example of the merchandise amount estimation unit 14 according to the present example embodiment will be described. The merchandise amount estimation unit 14 detects shopping baskets 603c within a range of a predetermined reference length L of a queue, in an image (Step S215). For example, the predetermined reference length L is a maximum length enabling detection of information required for estimating a merchandise amount, from an image, on the basis of a shopping basket 603. For example, the reference length L may be defined as a distance based on the merchandise registration device 20. Information indicating the reference length L is previously held in a memory 102 or the like and may be read and acquired by the merchandise amount estimation unit 14. The merchandise amount estimation unit 14 previously holds a feature value for extracting a shopping basket 603 by image recognition. Then, the merchandise amount estimation unit 14 detects a shopping basket 603c within the range of the reference length L, by performing matching processing using the feature value on the inside of the range of the reference length L in the image.

Next, the merchandise amount estimation unit 14 estimates a merchandise amount within the reference length L by the same method as the method of estimating an amount of intra-queue merchandise, according to any one of the first to third example embodiments (Step S216).

Further, the merchandise amount estimation unit 14 detects, in the image, a number of customers 602c beyond the reference length L by image recognition (Step S217). Then, the merchandise amount estimation unit 14 estimates a number of pieces of merchandise obtained by multiplying the detected number of people by an average number of pieces of merchandise per customer 602 as a merchandise amount beyond the reference length L (Step S218). Next, the merchandise amount estimation unit 14 estimates an amount of intra-queue merchandise by adding up the estimated merchandise amount within the reference length L and the estimated merchandise amount beyond the reference length L (Step S219).

Next, an operation and effect of the present example embodiment will be described. The present example embodiment provides the same operation and effect as the first example embodiment. In addition, the present example embodiment is able to predict a waiting time more accurately even when a queue becomes longer.

Fifth Example Embodiment

Figure 14:
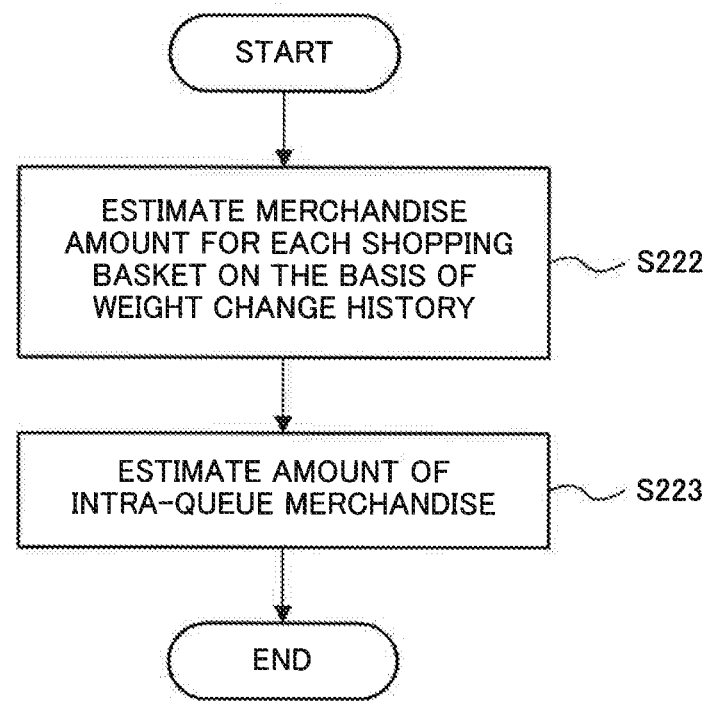
FIG. 14 is a flowchart exemplifying a flow of a merchandise amount estimation step executed by a merchandise amount estimation unit according to a fifth example embodiment.

FIG. 14 is a flowchart exemplifying a flow of Merchandise Amount Estimation Step S20 executed by a merchandise amount estimation unit 14 according to a fifth example embodiment. An information processing device 10 according to the present example embodiment is the same as the information processing device 10 according to the first example embodiment except for processing in Merchandise Amount Estimation Step S20 executed by the merchandise amount estimation unit 14 and an acquisition unit 12 further acquiring information indicating a weight of a shopping basket 603 in Acquisition Step S10.

The merchandise amount estimation unit 14 according to the present example embodiment estimates a merchandise amount for each shopping basket 603 on the basis of information indicating a weight change history of a shopping basket 603, the history being detected by a weight sensor attached to the shopping basket 603. Then, the merchandise amount estimation unit 14 estimates an amount of intra-queue merchandise by adding up the estimated merchandise amounts for the respective shopping baskets 603.

Each shopping basket 603 according to the present example embodiment is provided with a weight sensor for measuring a weight of the shopping basket 603, a memory for storing a weight change history of the shopping basket 603, and a transmitter for wirelessly transmitting information indicating the weight change history. The weight of the shopping basket 603 indirectly indicates a weight of the contents in the shopping basket 603. For example, the weight sensor is provided at the base of a handle on a shopping basket 603. Further, a plurality of receivers are provided along a place where a queue for a merchandise registration device 20 is formed.

Hardware Configuration

Figure 15:
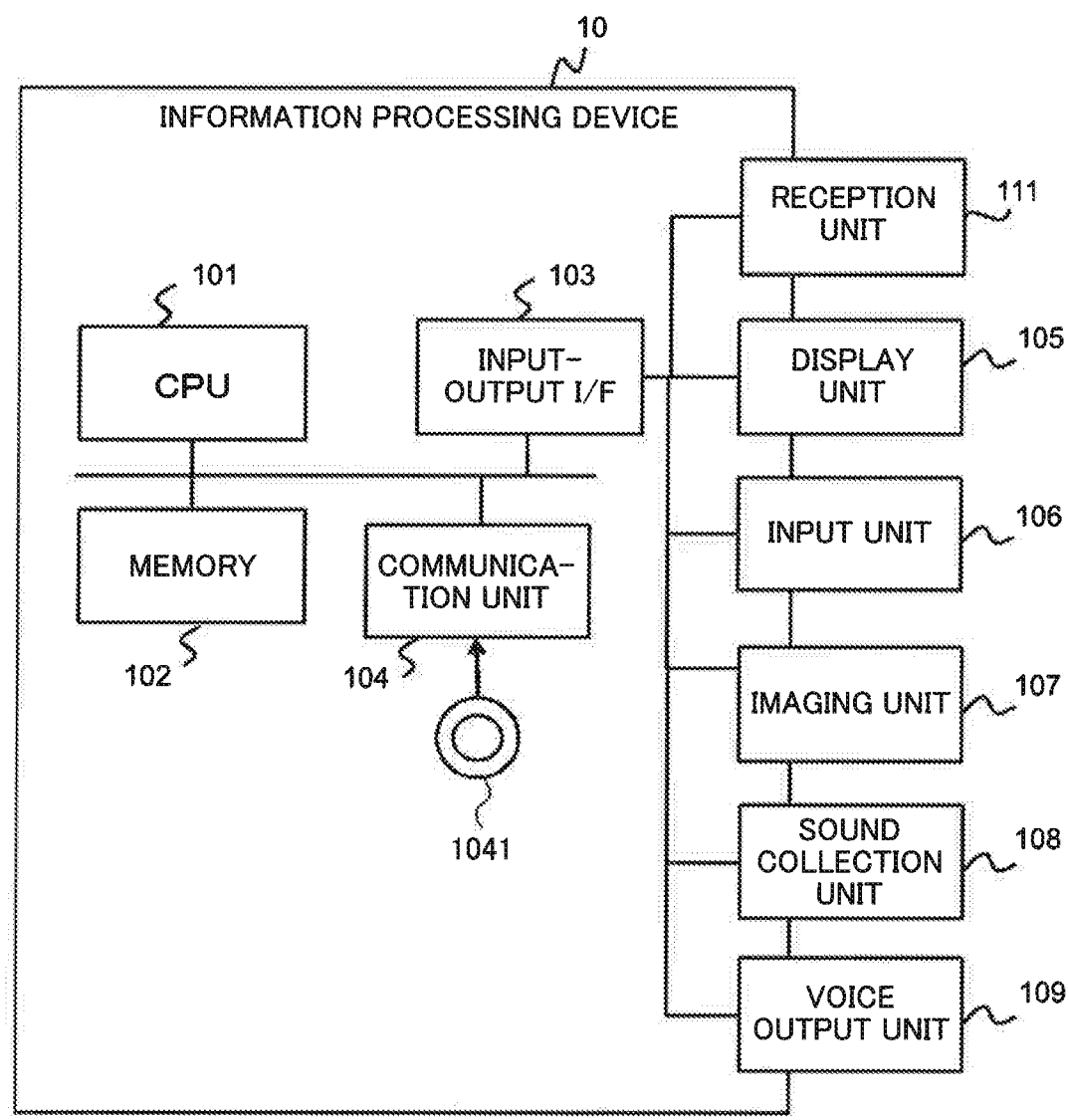
FIG. 15 is a diagram conceptually illustrating a hardware configuration example of an information processing device according to the fifth example embodiment.

FIG. 15 is a diagram conceptually illustrating a hardware configuration example of the information processing device 10 according to the present example embodiment. The hardware configuration example of the information processing device 10 according to the present example embodiment is the same as the hardware configuration example of the information processing device 10 according to the first example embodiment except for including a reception unit 111. As illustrated in the diagram, the reception unit 111 is connected to an input-output I/F 103. For example, the reception unit 111 is the aforementioned receiver. Similarly to the first example embodiment, the hardware configuration of the information processing device 10 is not limited to the configuration illustrated in the diagram. When the information processing device 10 does not include the reception unit 111, the information processing device 10 may acquire information obtained by a reception unit 111 included in another device, by communication through a communication unit 104.

Operation Example

With respect to shopping baskets 603 in a queue, the acquisition unit 12 according to the present example embodiment acquires information indicating a weight change history transmitted from each shopping basket 603. Specifically, for example, when each shopping basket 603 approaches a specific range of a receiver, information indicating a weight change history and an identification number of the shopping basket 603 is transmitted from a transmitter in the shopping basket 603 to a receiver. The identification number varies with each shopping basket 603. Then, the acquisition unit 12 according to the present example embodiment acquires information indicating the weight change history.

Next, the merchandise amount estimation unit 14 estimates a merchandise amount for each shopping basket 603 on the basis of information indicating the acquired weight change history of the shopping basket 603 in the queue (Step S222).

Figure 16:
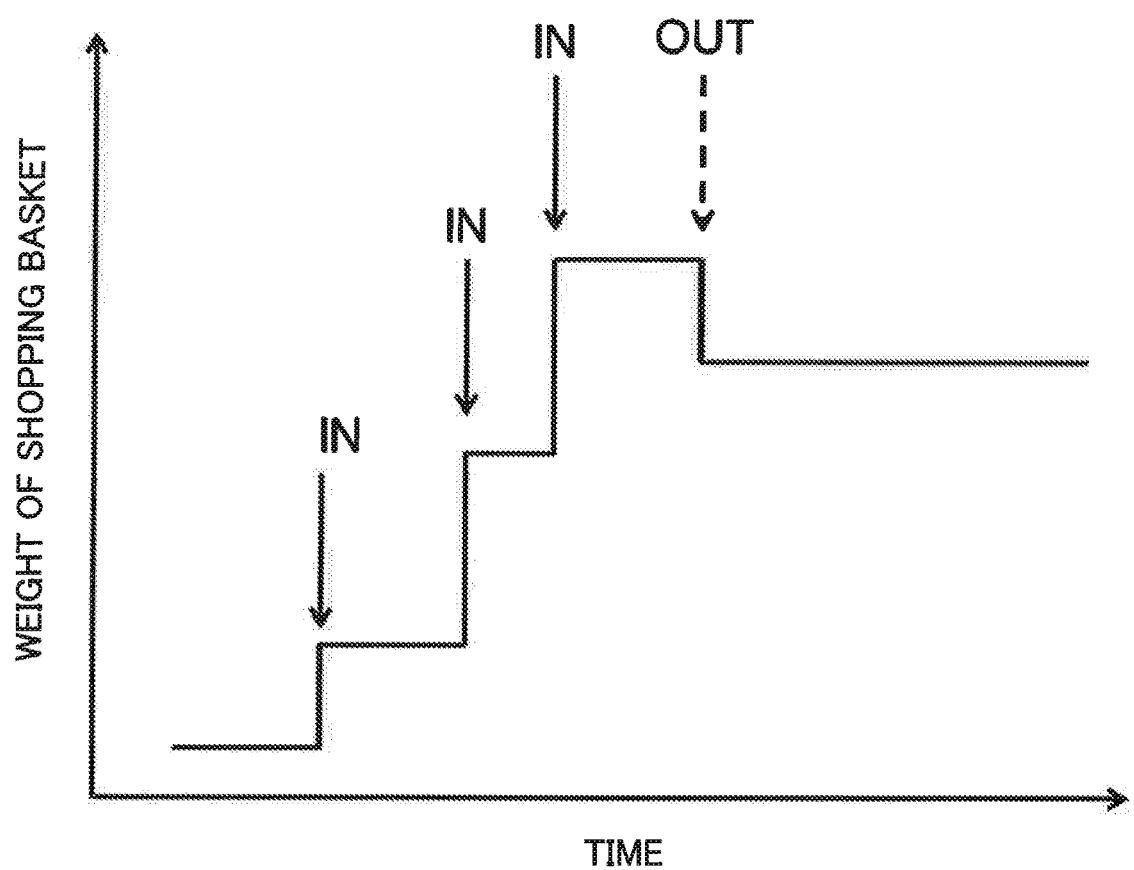
FIG. 16 is a diagram exemplifying a weight change history of a shopping basket.

FIG. 16 is a diagram exemplifying a weight change history of a shopping basket. As illustrated in the diagram, at a time point when merchandise is put into a shopping basket 603 (solid arrow), a weight of the shopping basket 603 increases stepwise. On the other hand, at a time point when merchandise is taken out of the shopping basket 603 (broken arrow), the weight decreases stepwise. The merchandise amount estimation unit 14 keeps count assuming such a stepwise increase as an increase of a piece of merchandise and assuming a stepwise decrease as a decrease of a piece of merchandise.

For example, in the example in the diagram, it may be estimated that, as a result of three pieces of merchandise being put in and one piece of merchandise being taken out, there are two pieces of merchandise in the shopping basket 603.

The merchandise amount estimation unit 14 estimates a number of pieces of merchandise obtained by adding up the estimated numbers of pieces of merchandise for respective shopping baskets 603 as an amount of intra-queue merchandise (Step S223).

Then, similarly to the method according to the first example embodiment, Number-of-people Detection Step S30 and Waiting Time Calculation Step S40 are performed, and an estimated waiting time and the like are reported to a customer.

Further, a receiver is provided close to a position where a merchandise-registered shopping basket 603 is placed. When a merchandise-registered shopping basket 603 approaches within a specific range of the receiver, information indicating an identification number of the shopping basket 603 is transmitted from a transmitter in the shopping basket 603 to the receiver. Then, the acquisition unit 12 acquires the information indicating the identification number of the shopping basket 603, and the merchandise amount estimation unit 14 subtracts a number of pieces of merchandise in the shopping basket 603 related to the identification number from the estimated number of intra-queue pieces of merchandise. Thus, the number of pieces of merchandise in the merchandise-registered shopping basket 603 is excluded.

A cart 604 may be similarly provided with a weight sensor, a memory, and a transmitter. Then, when a customer 602 uses a cart 604, information indicating a weight change history is acquired from the cart 604.

Next, an operation and effect of the present example embodiment will be described. The present example embodiment provides the same operation and effect as the first example embodiment. In addition, an operation and effect described below is obtained.

The present example embodiment is able to estimate an amount of intra-queue merchandise without performing image recognition.

Further, the present example embodiment is able to predict a waiting time more accurately.

Sixth Example Embodiment

Figure 17:
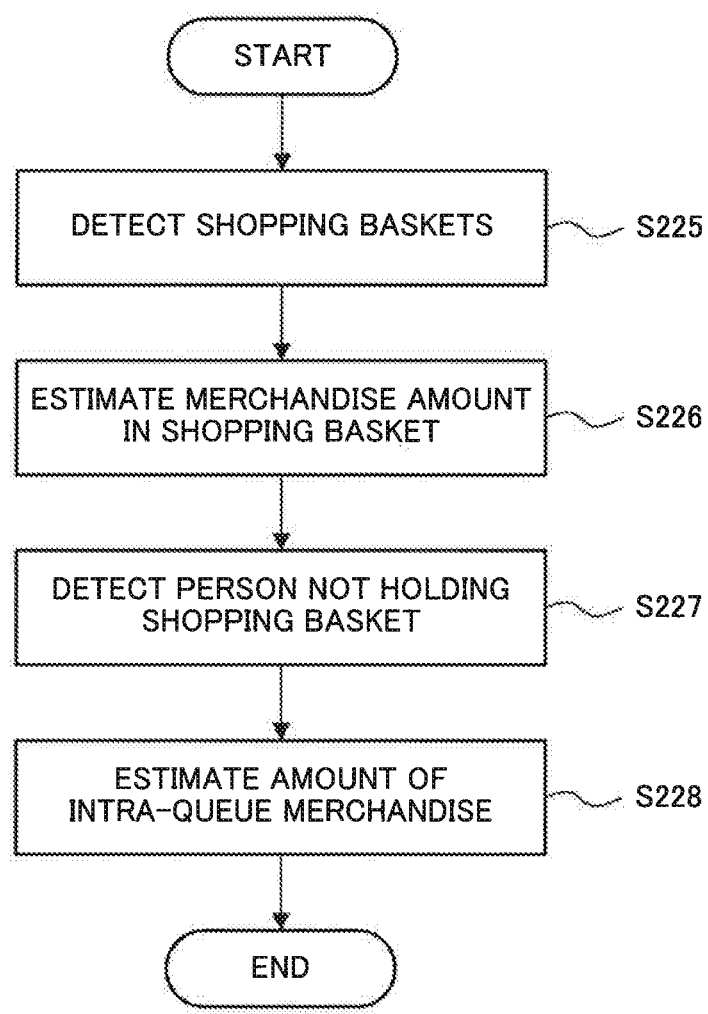
FIG. 17 is a flowchart exemplifying a flow of a merchandise amount estimation step executed by a merchandise amount estimation unit according to a sixth example embodiment.

FIG. 17 is a flowchart exemplifying a flow of Merchandise Amount Estimation Step S20 executed by a merchandise amount estimation unit 14 according to a sixth example embodiment. An information processing device 10 according to the present example embodiment is the same as the information processing device 10 according to the first example embodiment except for processing in Merchandise Amount Estimation Step S20 executed by the merchandise amount estimation unit 14.

Figure 18:
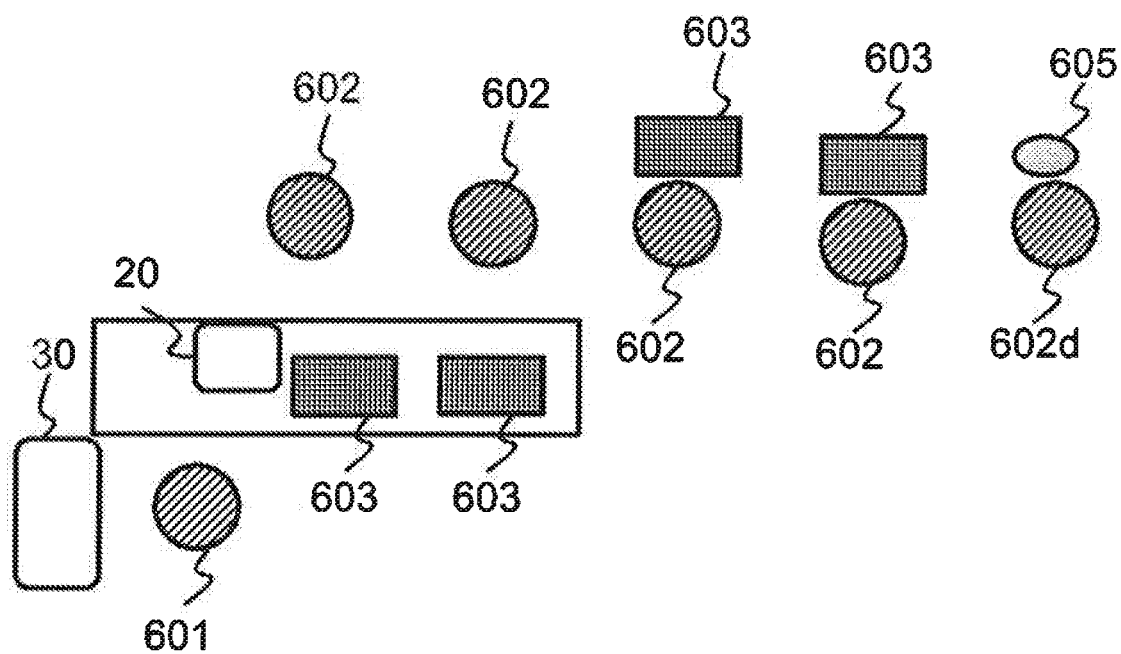
FIG. 18 is a diagram illustrating an example of an image information of which is acquired by an acquisition unit according to the sixth example embodiment.

FIG. 18 is a diagram illustrating an example of an image information of which is acquired by an acquisition unit 12 according to the present example embodiment. The diagram corresponds to FIG. 4 according to the first example embodiment. In a case that an amount of merchandise to be purchased is small, or the like, some person in a queue may hold merchandise 605 in a hand without using a shopping basket 603.

With respect to a person not holding a shopping basket 603, out of people queuing up for a merchandise registration device 20 in an image, the merchandise amount estimation unit 14 according to the present example embodiment estimates a predetermined amount as a merchandise amount of the person. Details will be described below.

Similarly to the method according to the first example embodiment, the merchandise amount estimation unit 14 detects shopping baskets 603 in an image (Step S225). Then, by the same method as the method of estimating an amount of intra-queue merchandise, according to any one of the first to fifth example embodiments, the merchandise amount estimation unit 14 estimates a merchandise amount in shopping baskets 603 in a queue (Step S226).

Further, the merchandise amount estimation unit 14 detects a customer 602d not holding a shopping basket 603 in the image (Step S227). For example, the merchandise amount estimation unit 14 previously holds feature values for respectively extracting a shopping basket 603 and a person by image recognition. Then, by matching processing using the feature values, the merchandise amount estimation unit 14 detects a person and a shopping basket 603 and detects a positional relation between the person and the shopping basket 603 in the image. Then, the merchandise amount estimation unit 14 assumes that a person within a specific distance of whom a shopping basket 603 does not exist as a customer 602d not holding a shopping basket 603.

Next, the merchandise amount estimation unit 14 adds up a number obtained by multiplying a number of customers 602d by an average number of pieces of merchandise of a customer 602 not holding a shopping basket 603 and an estimated value of the merchandise amount put in the shopping baskets 603 in the queue. The merchandise amount estimation unit 14 estimates the thus obtained number of pieces of merchandise as an amount of intra-queue merchandise (S228).

Next, an operation and effect of the present example embodiment will be described. The present example embodiment provides the same operation and effect as the first example embodiment. In addition, present example embodiment is able to predict a waiting time more accurately even when a customer 602 not using a shopping basket 603 is included.

Seventh Example Embodiment

Figure 19:
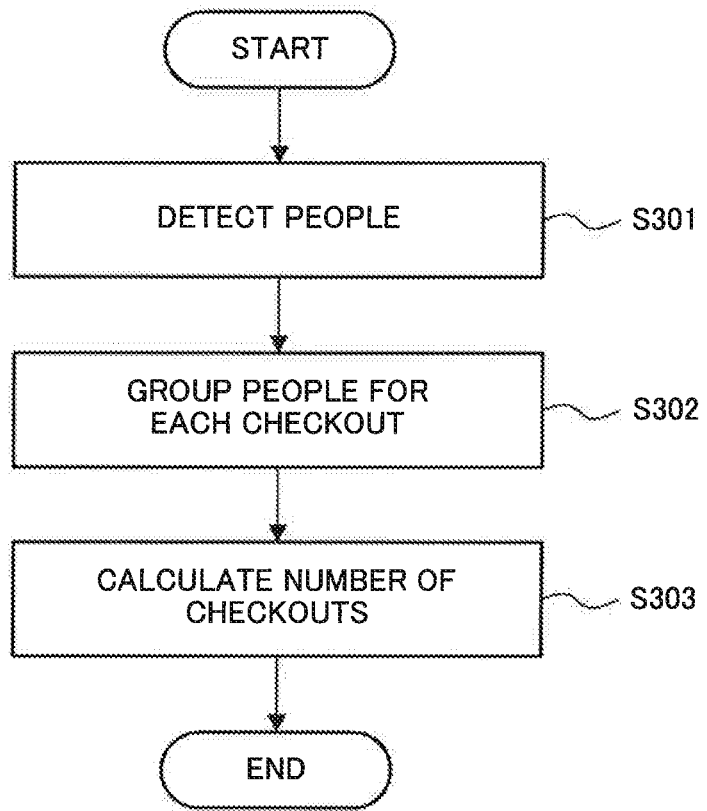
FIG. 19 is a flowchart exemplifying a flow of a number-of-people detection step executed by a number-of-people detection unit according to a seventh example embodiment.

FIG. 19 is a flowchart exemplifying a flow of Number-of-people Detection Step S30 executed by a number-of-people detection unit 16 according to a seventh example embodiment. An information processing device 10 according to the present example embodiment is the same as the information processing device 10 according to any one of the first to sixth example embodiments except for processing in Number-of-people Detection Step S30 executed by the number-of-people detection unit 16 and processing in Waiting Time Calculation Step S40 executed by a waiting time estimation unit 18.

Figure 20:
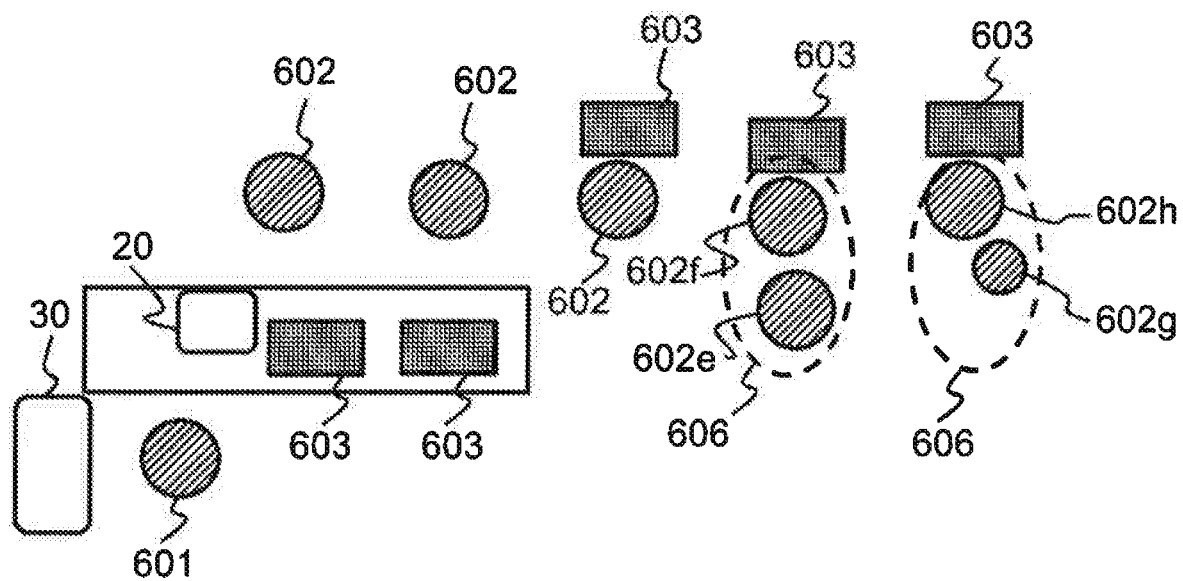
FIG. 20 is a diagram illustrating an example of an image information of which is acquired by an acquisition unit according to the seventh example embodiment.

FIG. 20 is a diagram illustrating an example of an image information of which is acquired by an acquisition unit 12 according to the present example embodiment. The diagram corresponds to FIG. 4 according to the first example embodiment. Every one of customers 602 in a queue does not necessarily perform a checkout. When a group 606 including a family or friends shops collectively, a checkout is performed collectively for each group 606.

The number-of-people detection unit 16 according to the present example embodiment groups two or more people estimated to check out collectively, out of a plurality of people queuing up for a merchandise registration device 20 in an image. Details will be described below.

The number-of-people detection unit 16 detects people in a queue, similarly to the method according to the first example embodiment (Step S301). Next, the number-of-people detection unit 16 groups the detected people (customers 602) for each checkout (Step S302). For example, the number-of-people detection unit 16 may assume a customer 602f and a customer 602e distance between whom is less than a specific value as friends and form a group 606.

Further, the number-of-people detection unit 16 may form a group 606 of a customer 602g assumed to be a child and a closest adult customer 602h. Further, when a dynamic image is formed with frames of a plurality of sequential images, the number-of-people detection unit 16 may assume that a plurality of customers 602 occasionally facing one another as friends and form a group 606.

Next, the number-of-people detection unit 16 calculates a number of checkouts. For example, the number-of-people detection unit 16 calculates the number of checkouts by adding up a number of customers 602 not belonging to groups 606 and a number of the groups 606 (Step S303).

The waiting time estimation unit 18 according to the present example embodiment calculates estimated time required for checkout by using the number of checkouts calculated by the number-of-people detection unit 16 in place of a detected number of people. Waiting Time Calculation Step S40 performed by the waiting time estimation unit 18 is similar to that according to the first example embodiment in other respects.

Next, an operation and effect of the present example embodiment will be described. The present example embodiment provides the same operation and effect as the first example embodiment. In addition, the present example embodiment is able to predict a waiting time more accurately even when a group of a plurality of people performs a collective checkout.

Eighth Example Embodiment

Figure 21:
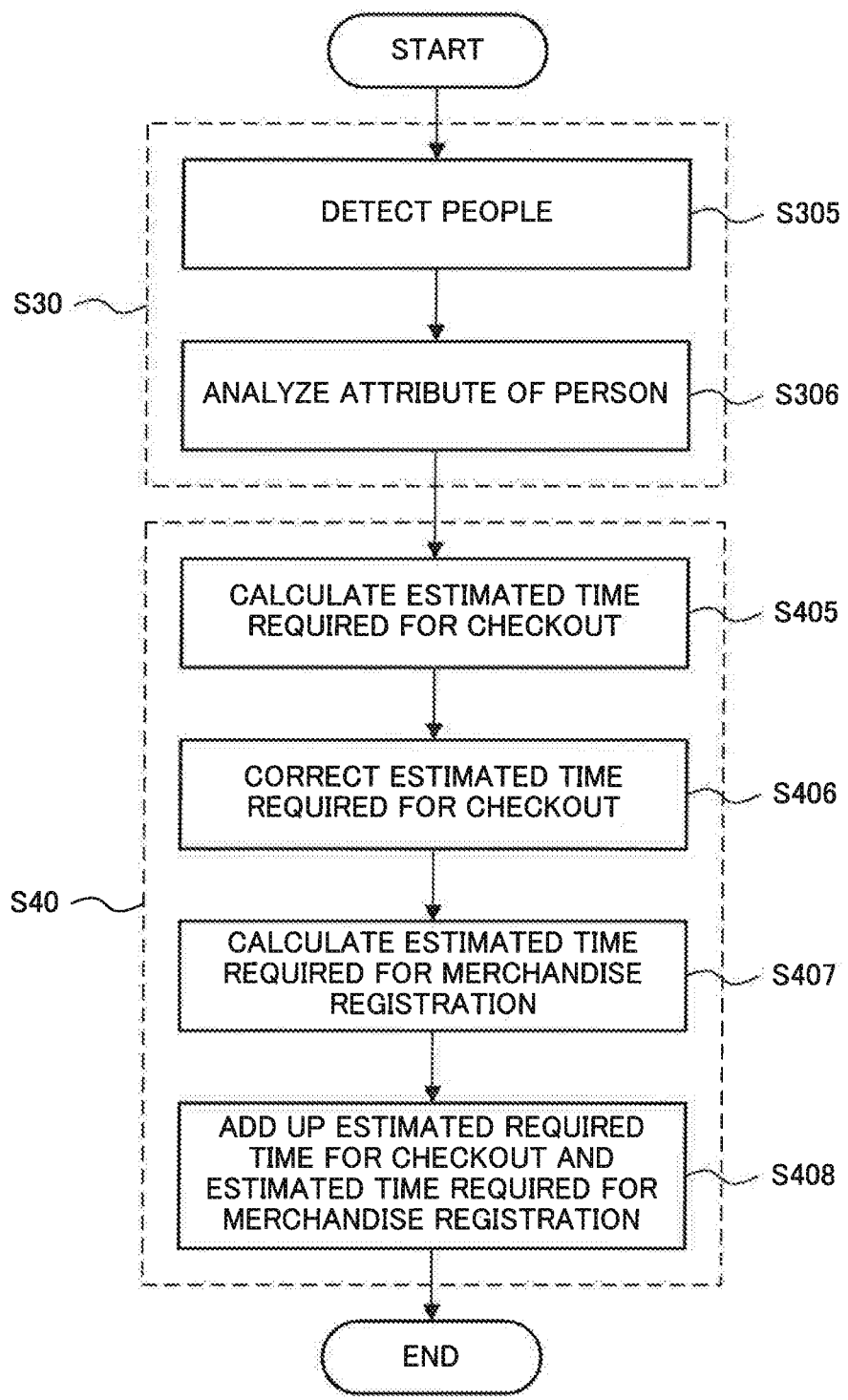
FIG. 21 is a flowchart exemplifying a flow of a number-of-people detection step and a waiting time calculation step that are executed by a number-of-people detection unit according to an eighth example embodiment.

FIG. 21 is a flowchart exemplifying a flow of Number-of-people Detection Step S30 and Waiting Time Calculation Step S40 that are executed by a number-of-people detection unit 16 according to an eighth example embodiment. An information processing device 10 according to the present example embodiment is the same as the information processing device 10 according to any one of the first to sixth example embodiments except for processing in Number-of-people Detection Step S30 executed by the number-of-people detection unit 16 and processing in Waiting Time Calculation Step S40 executed by a waiting time estimation unit 18.

Time required for checkout varies with each customer 602. For example, it is inferred that the homemakers accustomed to shopping perform checkouts smoothly on the basis of daily experiences, and the time required for checkout is short. On the other hand, in a case of an aged customer, it is inferred that a checkout is performed with an unhurried conversation, and therefore the time required for checkout is long.

The number-of-people detection unit 16 according to the present example embodiment analyzes an attribute of each person queuing up for a merchandise registration device 20. Further, the waiting time estimation unit 18 according to the present example embodiment calculates estimated time required for checkout on the basis of a number of people detected by the number-of-people detection unit 16 and corrects the estimated required time on the basis of the attribute. Details will be described below.

The number-of-people detection unit 16 according to the present example embodiment detects people in a queue, similarly to the method according to the first example embodiment (Step S305). Next, the number-of-people detection unit 16 analyzes an attribute of each detected person (Step S306). For example, the attribute is defined according to age and sex. The number-of-people detection unit 16 previously holds a feature value for each attribute for detecting an attribute of a person by image recognition. Then, by matching processing using the feature value, the number-of-people detection unit 16 is able to analyze an attribute of each person.

Next, the waiting time estimation unit 18 calculates estimated time required for checkout, similarly to the method according to the first example embodiment (Step S405). Then, the waiting time estimation unit 18 corrects the estimated time required for checkout on the basis of the attribute analyzed by the number-of-people detection unit 16 (Step S406). For example, the waiting time estimation unit 18 may correct the estimated time required for checkout as follows.

A memory 102 or the like previously stores data associated with a relation between an attribute and a corrected value. The corrected value indicates a time to be increased or decreased with respect to the estimated time required for checkout and is obtained on the basis of an average value obtained in a pre-survey. The waiting time estimation unit 18 acquires the data, obtains a corrected value related to an attribute of a person analyzed by the number-of-people detection unit 16, and adds up the corrected values for all the detected people. The total corrected value may be a positive value or a negative value. Then, by adding the total corrected value to the estimated time required for checkout calculated in Step S405, the estimated time is corrected.

Further, the waiting time estimation unit 18 calculates estimated time required for merchandise registration, similarly to the method according to the first example embodiment (Step S407) and adds up the corrected estimated time required for checkout and the estimated time required for merchandise registration (Step S408).

In the information processing method according to the present example embodiment, the grouping processing may be further performed, similarly to the seventh example embodiment. In that case, for example, a person whose attribute is related to a least estimated time required for checkout in a group is estimated to be a person who performs a checkout in the group and the estimated required time is corrected accordingly.

Next, an operation and effect of the present example embodiment will be described. The present example embodiment provides the same operation and effect as the first example embodiment. In addition, the present example embodiment is able to predict a waiting time more accurately.

Ninth Example Embodiment

An information processing device 10 having a minimum configuration for obtaining the effect of the present invention in the information processing device 10 according to the first example embodiment, according to the present example embodiment, will be described.

Processing Configuration

Figure 22:
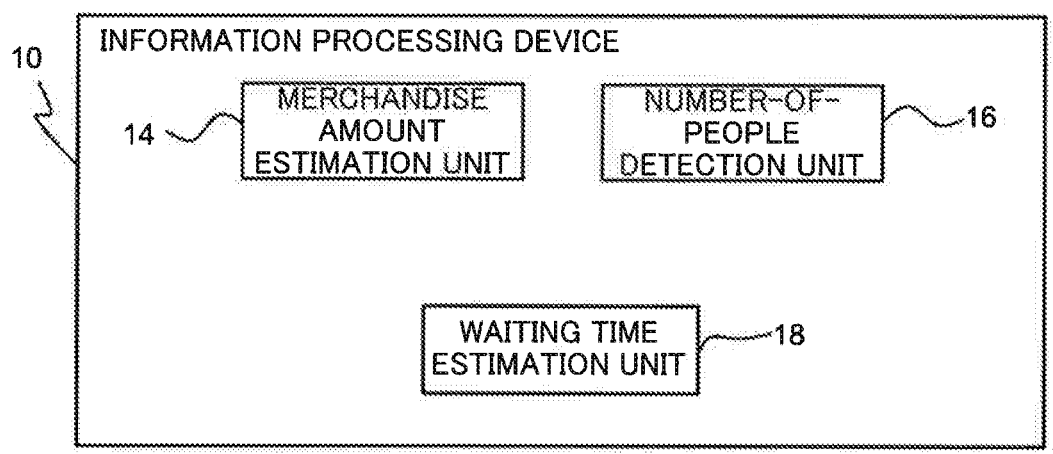
FIG. 22 is a block diagram exemplifying an information processing device according to a ninth example embodiment.

FIG. 22 is a diagram exemplifying a processing configuration of the information processing device 10 according to the present example embodiment. As illustrated in the diagram, the information processing device 10 includes a merchandise amount estimation unit 14, a number-of-people detection unit 16, and a waiting time estimation unit 18. The merchandise amount estimation unit 14 estimates a total merchandise amount of people queuing up for a merchandise registration device 20. The number-of-people detection unit 16 detects a number of people queuing up for the merchandise registration device 20. The waiting time estimation unit 18 calculates a predicted value of a waiting time for each merchandise registration device 20 on the basis of the total merchandise amount and the number of people.

Hardware Configuration

The information processing device 10 according to the present example embodiment has a hardware configuration similar to that according to the first example embodiment as illustrated in FIG. 2. For example, the merchandise amount estimation unit 14, the number-of-people detection unit 16, and the waiting time estimation unit 18, according to the present example embodiment, are provided by program modules for providing functions of the merchandise amount estimation unit 14, the number-of-people detection unit 16, and the waiting time estimation unit 18, the program modules being executed by a CPU 101. For example, the program modules for providing the functions of the merchandise amount estimation unit 14, the number-of-people detection unit 16, and the waiting time estimation unit 18 are stored in a memory 102.

Operation Example

Figure 23:
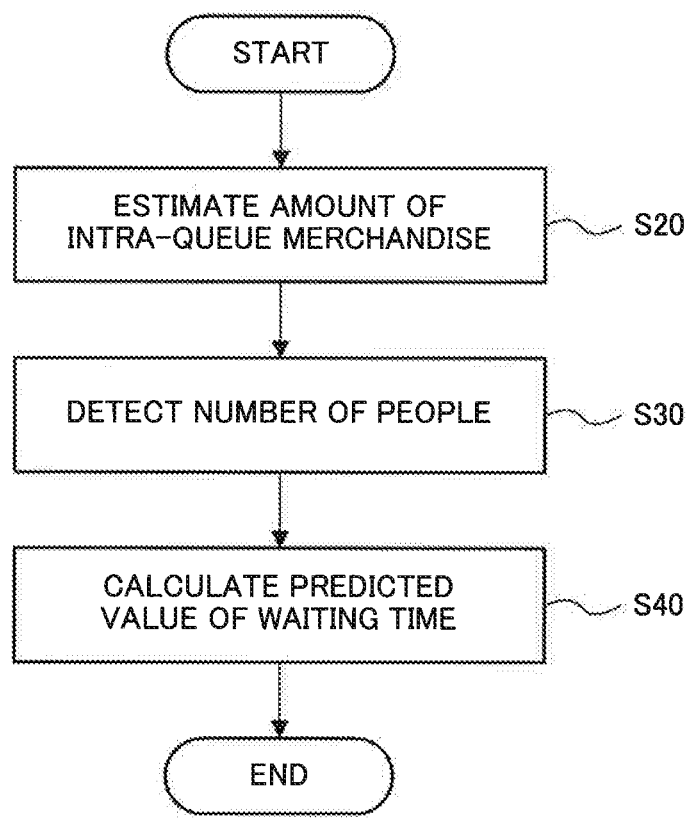
FIG. 23 is a flowchart exemplifying a flow of processing executed by the information processing device according to the ninth example embodiment.

FIG. 23 is a flowchart exemplifying a flow of processing executed by the information processing device according to the present example embodiment. An operation example of the information processing device 10 according to the present example embodiment will be described below.

The merchandise amount estimation unit 14 estimates a total merchandise amount of people queuing up for a merchandise registration device 20 in response to a predetermined manipulation (manipulation being a trigger for performing information processing) in the information processing device 10 (Merchandise Amount Estimation Step S20). The number-of-people detection unit 16 detects a number of people queuing up for the merchandise registration device 20 (Number-of-people Detection Step S30). Then, the waiting time estimation unit 18 calculates a predicted value of a waiting time for each merchandise registration device on the basis of the total merchandise amount and the number of people (Waiting Time Calculation Step S40).

As described above, the present example embodiment information processing device 10 is able to provide a customer with information about a waiting time.

Tenth Example Embodiment

Figure 24:
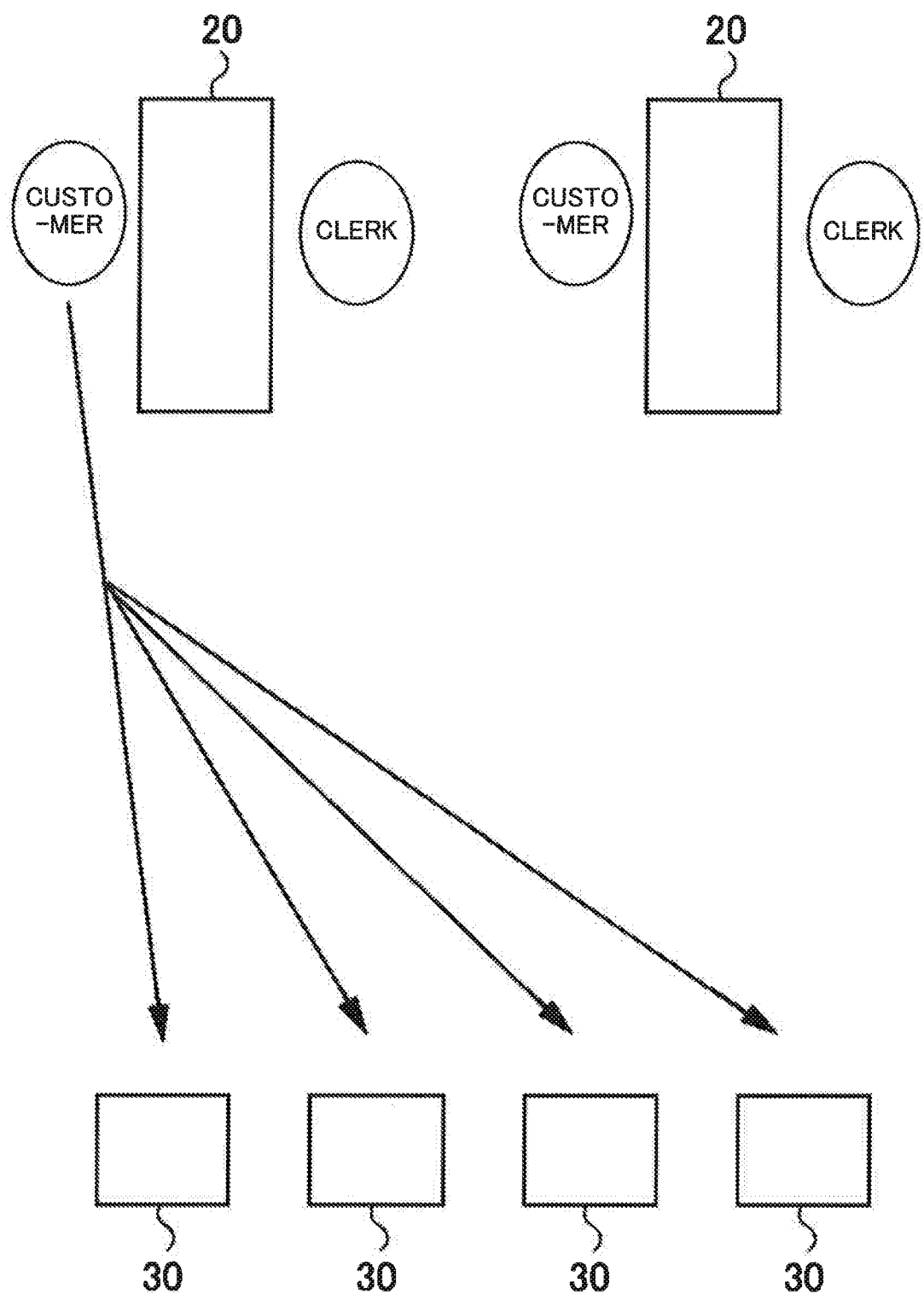
FIG. 24 is a diagram conceptually exemplifying a flow of a customer purchasing merchandise at a store where a merchandise registration device and a checkout device are installed, according to a tenth example embodiment.

FIG. 24 is a diagram conceptually exemplifying a flow of a customer purchasing merchandise at a store where a merchandise registration device 20 and a checkout device 30, according to a tenth example embodiment, are installed. First, the customer goes to a merchandise registration device 20 with merchandise to be purchased. Then, a clerk manipulates the merchandise registration device 20 and performs registration processing of the merchandise. Subsequently, the customer goes to the checkout device 30 and performs checkout of the merchandise by paying a charge and the like.

In this case, the clerk performs registration with the merchandise registration device 20, and the customer performs checkout in person with the checkout device 30. Accordingly, a waiting time for each merchandise registration device 20 may be inferred as a total sum of time required for merchandise registration, and time required for checkout does not need to be considered. Then, the time required for merchandise registration may be inferred on the basis of an amount of merchandise to be registered.

Processing Configuration

Figure 25:
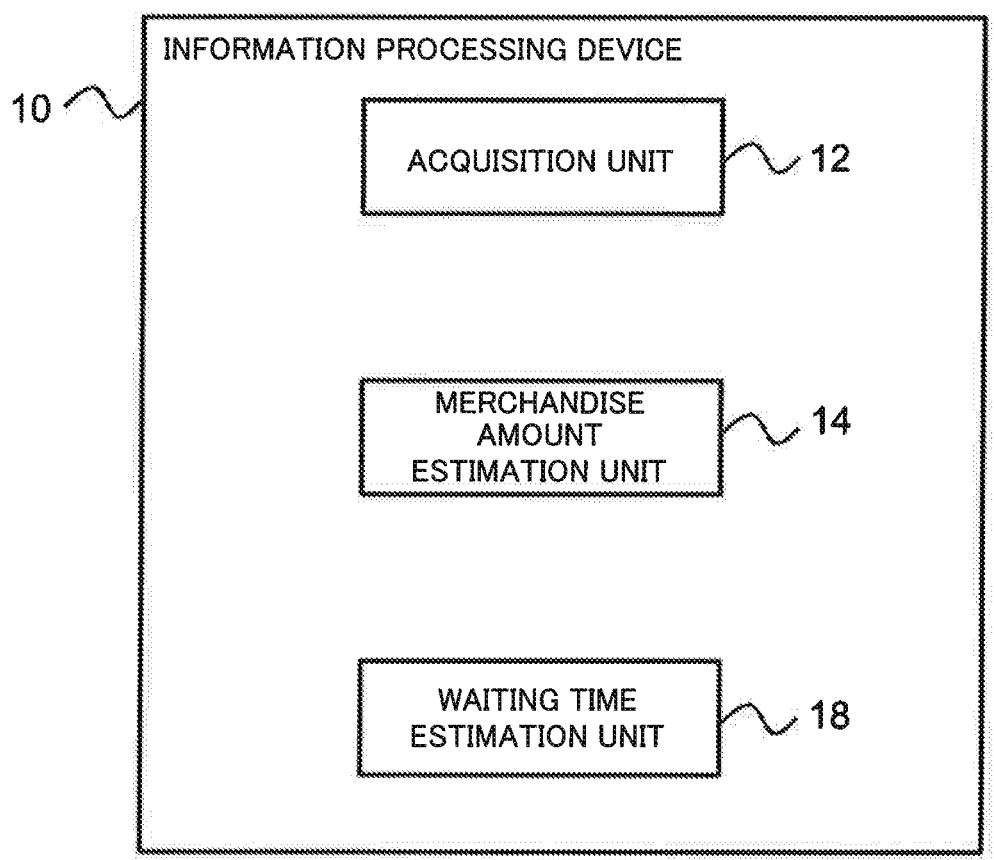
FIG. 25 is a block diagram exemplifying an information processing device according to the tenth example embodiment.

FIG. 25 is a block diagram exemplifying the information processing device 10 according to the tenth example embodiment. In the diagram, each block represents a configuration based on a function unit rather than a configuration based on a hardware unit. The information processing device 10 according to the present example embodiment includes a merchandise amount estimation unit 14 (detection means) and a waiting time estimation unit 18. The merchandise amount estimation unit 14 detects shopping baskets of people queuing up for a merchandise registration device (POS device). The waiting time estimation unit 18 calculates a predicted value of a waiting time for each merchandise registration device 20 on the basis of the detection result by the merchandise amount estimation unit 14.

The information processing device 10 according to the present example embodiment does not need to include a number-of-people detection unit 16 as is the case with the first example embodiment.

In the information processing device 10 according to the present example embodiment, the merchandise amount estimation unit 14 detects shopping baskets 603 and estimates a total merchandise amount of people queuing up for a merchandise registration device 20. Then, the waiting time estimation unit 18 calculates a predicted value of a waiting time for each merchandise registration device 20 on the basis of the total merchandise amount.

The information processing device 10 according to the present example embodiment further includes an acquisition unit 12 acquiring information indicating an image capturing a queue of people queuing up for a merchandise registration device 20. The merchandise amount estimation unit 14 estimates the total merchandise amount by using the image.

Operation Example

Figure 26:
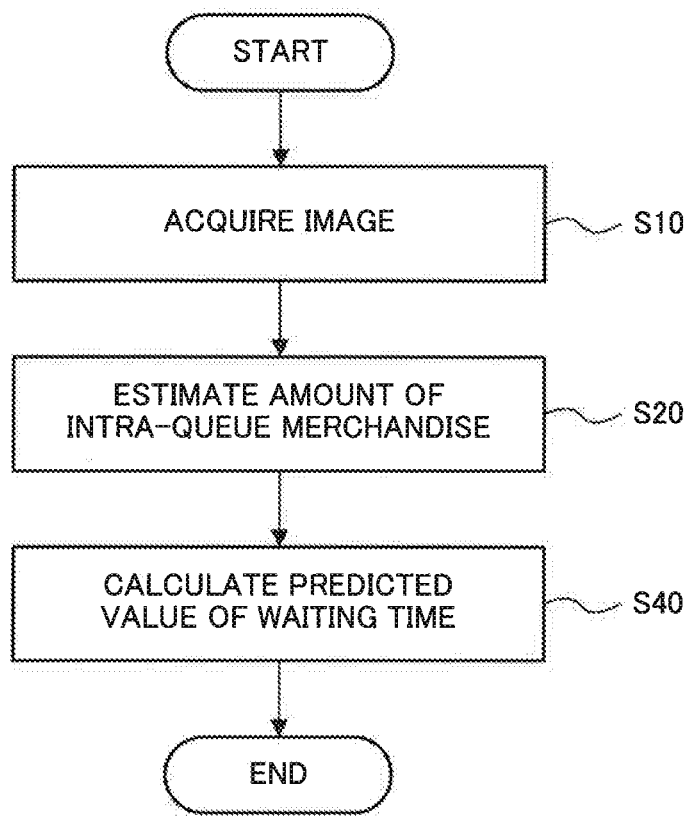
FIG. 26 is a flowchart exemplifying a flow of processing executed by the information processing device according to the tenth example embodiment.

FIG. 26 is a flowchart exemplifying a flow of processing executed by the information processing device 10 according to the present example embodiment. An information processing method according to the present example embodiment includes Merchandise Amount Estimation Step S20 (detection step) and Waiting Time Calculation Step S40. In Merchandise Amount Estimation Step S20, shopping baskets of people queuing up for a merchandise registration device 20 are detected. In Waiting Time Calculation Step S40, a predicted value of a waiting time for each merchandise registration device 20 is calculated on the basis of the detection result in Merchandise Amount Estimation Step S20. Details will be described below.

The information processing method according to the present example embodiment further includes Acquisition Step S10. In Acquisition Step S10, information indicating an image capturing a queue of people queuing up for a merchandise registration device 20 is acquired. In Merchandise Amount Estimation Step S20, a total merchandise amount is estimated by using the image.

Further, in Merchandise Amount Estimation Step S20 in the information processing method according to the present example embodiment, a shopping basket 603 is detected, and a total merchandise amount of people queuing up for a merchandise registration device 20 is estimated.

Then, in Waiting Time Calculation Step S40, a predicted value of a waiting time for each merchandise registration device 20 is calculated on the basis of the total merchandise amount.

The acquisition unit 12 according to the present example embodiment acquires an image similarly to Acquisition Step S10 according to the first example embodiment. Next, the merchandise amount estimation unit 14 estimates an amount of intra-queue merchandise similarly to Merchandise Amount Estimation Step S20 according to any one of the first to sixth example embodiments except for the case of using the method according to the fifth example embodiment.

Processing in Waiting Time Calculation Step S40 performed by the waiting time estimation unit 18 is similar to the processing in Waiting Time Calculation Step S40 according to the first example embodiment except for not calculating estimated time required for checkout. The waiting time estimation unit 18 calculates a predicted value of a waiting time for each merchandise registration device 20 on the basis of the estimated amount of intra-queue merchandise, for example, as follows. The waiting time estimation unit 18 calculates a time obtained by multiplying a number of intra-queue pieces of merchandise estimated by the merchandise amount estimation unit 14 by an average value of time required for registration of each piece of merchandise as estimated time required for merchandise registration. Then, the waiting time estimation unit 18 calculates the estimated time required for merchandise registration as a predicted value of a waiting time for each merchandise registration device 20.

The predicted value of a waiting time calculated by the waiting time estimation unit 18 is displayed on a display unit for customers for each merchandise registration device 20 in such a way that a customer is able to see the value, similarly to the first example embodiment.

The method according to the present example embodiment is also valid in a case that a plurality of cashiers are placed at one merchandise registration device in the system configuration according to the first to ninth example embodiments. In this case, one cashier performs merchandise registration, and another cashier performs checkout. Accordingly, a waiting time for each merchandise registration device 20 may be inferred to be a total sum of time required for merchandise registration, and time required for checkout does not need to be considered. Further, the method according to any one of the first to ninth example embodiments and the method according to the present example embodiment may be switched as appropriate depending on a state of placement of a clerk.

Next, an operation and effect of the present example embodiment will be described. The information processing device 10 and the information processing method, according to the present example embodiment, are able to provide a customer with information about a waiting time. Consequently, the customer is able to finish shopping comfortably. Further, alleviation of congestion and enhanced work efficiency can be provided by customers spreading over respective merchandise registration devices 20 and checkout processing at the store progressing smoothly.

MODIFIED EXAMPLE

FIG. 33 is a flowchart exemplifying a flow of processing executed by an information processing device 10 according to a modified example of the tenth example embodiment. The modified example of the tenth example embodiment will be described below. The information processing device 10 according to the present example embodiment is similar to the information processing device 10 according to the tenth example embodiment except for a processing content in Merchandise Amount Estimation Step S20 (detection step) performed by a merchandise amount estimation unit 14.

The information processing device 10 according to the modified example includes the merchandise amount estimation unit 14 (detection means) and a waiting time estimation unit 18. The merchandise amount estimation unit 14 detects a number of shopping baskets 603 of people queuing up for a merchandise registration device 20 (POS device). The waiting time estimation unit 18 calculates a predicted value of a waiting time for each merchandise registration device 20 on the basis of the number of shopping baskets 603. Details will be described below.

The information processing device 10 according to the present example embodiment calculates a merchandise amount for an entire queue by estimating a merchandise amount on the basis of a number of shopping baskets 603 with respect to part of a queue formed for a merchandise registration device 20 and by using a merchandise amount for each shopping basket 603 with respect to the remaining part.

The acquisition unit 12 according to the present example embodiment acquires information indicating an image capturing a queue of people queuing up for a merchandise registration device 20, similarly to the tenth example embodiment.

In Merchandise Amount Estimation Step S20 according to the present example embodiment, the merchandise amount estimation unit 14 detects a number of shopping baskets 603 included in a predetermined area in an image acquired by the acquisition unit 12 (Step S230). The detection method is similar to the method according to the second example embodiment.

Further, the merchandise amount estimation unit 14 estimates a merchandise amount for each shopping basket 603 with respect to shopping baskets 603 within a predetermined reference length of a queue out of the detected shopping baskets 603 (Step S231). The method of estimating a merchandise amount for each shopping basket 603 is similar to at least one of the methods according to the first, third, and fifth example embodiments. Furthermore, two or more of the methods may be used in combination. Then, the merchandise amount estimation unit 14 calculates a merchandise amount in the shopping baskets 603 within the reference length by adding up the estimated merchandise amounts for the respective shopping baskets 603.

Next, the merchandise amount estimation unit 14 calculates a number of shopping baskets 603 beyond the reference length by subtracting the number of shopping baskets 603 for each of which a merchandise amount is estimated in Step S231 from the number of shopping baskets 603 detected in Step S230. Then, the merchandise amount estimation unit 14 calculates a merchandise amount in the shopping baskets 603 beyond the reference length by multiplying the number of shopping baskets 603 beyond the reference length by an average merchandise amount per shopping basket 603. The merchandise amount per shopping basket 603 may be acquired similarly to an average number of pieces of merchandise in a shopping basket 603, according to the second example embodiment.

Then, the merchandise amount estimation unit 14 calculates an amount of intra-queue merchandise by adding up the calculated merchandise amount in the shopping baskets 603 within the reference length and the calculated merchandise amount in the shopping baskets 603 beyond the reference length (Step S232).

Next, the waiting time estimation unit 18 according to the present example embodiment calculates a predicted value of a waiting time similarly to the tenth example embodiment.

In Step S230, a number of shopping baskets 603 included in an area including a part beyond the predetermined reference length in the queue may be detected. In this case, the merchandise amount estimation unit 14 is able to estimate an amount of intra-queue merchandise by adding up a value obtained by multiplying the detected number by the average value of a merchandise amount per shopping basket 603 and the merchandise amount in the shopping baskets 603 within the reference length.

The merchandise amount estimation unit 14 may calculate the merchandise amount in shopping baskets 603 within the reference length on the basis of a number of shopping baskets 603 and calculate the merchandise amount in shopping baskets 603 beyond the reference length on the basis of a number of people as is the case with the method according to the fourth example embodiment. Also in that case, the merchandise amount estimation unit 14 is able to calculate an amount of intra-queue merchandise by adding up the calculated merchandise amount in the shopping baskets 603 within the reference length and the calculated merchandise amount in the shopping baskets 603 beyond the reference length.

The merchandise amount estimation unit 14 may further detect a number of carts 604 and estimate an amount of intra-queue merchandise by using the number of carts 604 and a number of shopping baskets 603, similarly to the second example embodiment.

The merchandise amount estimation unit 14 may detect a number of all shopping baskets 603 in a queue and correct an amount of intra-queue merchandise obtained by multiplying the number by an average merchandise amount per shopping basket 603, by an estimated merchandise amount for each shopping basket 603. The merchandise amount for each shopping basket 603 may be estimated for at least part of shopping baskets 603 in the queue. The estimation may be performed similarly to at least one of the methods according to the first, third, and fifth example embodiments. The merchandise amount estimation unit 14 may use two or more of the methods in combination.

Furthermore, in the modified example, a merchandise amount of a person not holding a shopping basket 603 may be estimated by applying the method according to the sixth example embodiment, and an amount of intra-queue merchandise may be estimated by further using the merchandise amount.

Next an operation and effect of the modified example will be described. The information processing device 10 and the information processing method, according to the modified example, are able to provide a customer with information about a waiting time. Consequently, the customer is able to finish shopping comfortably. Further, alleviation of congestion and enhanced work efficiency can be provided by customers spreading over respective merchandise registration devices 20 and checkout processing at the store progressing smoothly.

Eleventh Example Embodiment

An information processing device 10 having a minimum configuration for obtaining the effect of the present invention in the information processing device 10 according to the modified example of the tenth example embodiment, according to the present example embodiment, will be described.

Processing Configuration

Figure 27:
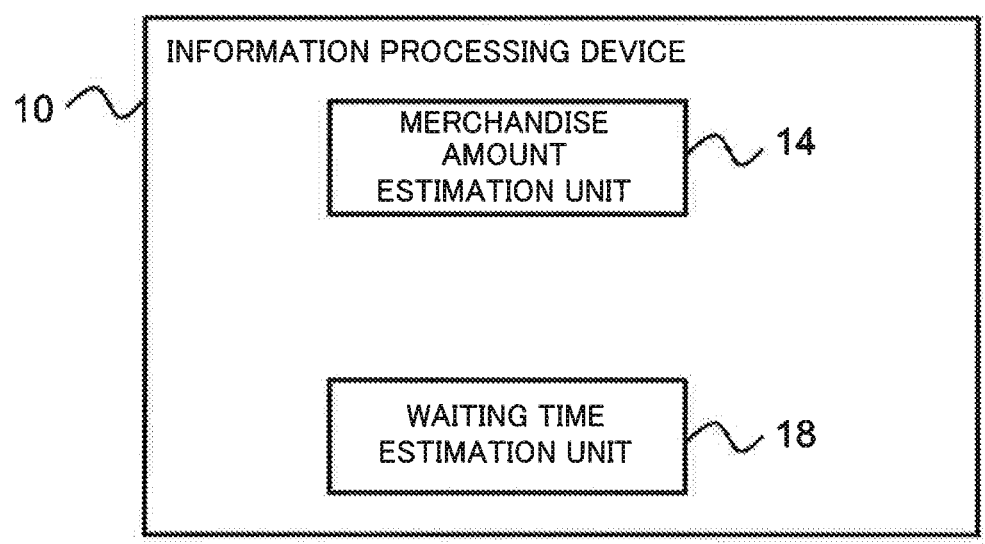
FIG. 27 is a block diagram exemplifying an information processing device according to an eleventh example embodiment.

FIG. 27 is a diagram exemplifying a processing configuration of the information processing device 10 according to the present example embodiment. As illustrated in the diagram, the information processing device 10 includes a merchandise amount estimation unit 14 (detection means) and a waiting time estimation unit 18. The merchandise amount estimation unit 14 detects a number of shopping baskets of people queuing up for a merchandise registration device (POS device). The waiting time estimation unit 18 calculates a predicted value of a waiting time for each merchandise registration device 20 on the basis of the number of shopping baskets.

Hardware Configuration

The information processing device 10 according to the present example embodiment has a hardware configuration similar to that according to the first example embodiment as illustrated in FIG. 2. For example, the merchandise amount estimation unit 14 and the waiting time estimation unit 18, according to the present example embodiment, are provided by program modules for providing functions of the merchandise amount estimation unit 14 and the waiting time estimation unit 18, the program modules being executed by a CPU 101. For example, the program modules for providing the functions of the merchandise amount estimation unit 14 and the waiting time estimation unit 18 are stored in a memory 102.

Operation Example

Figure 28:
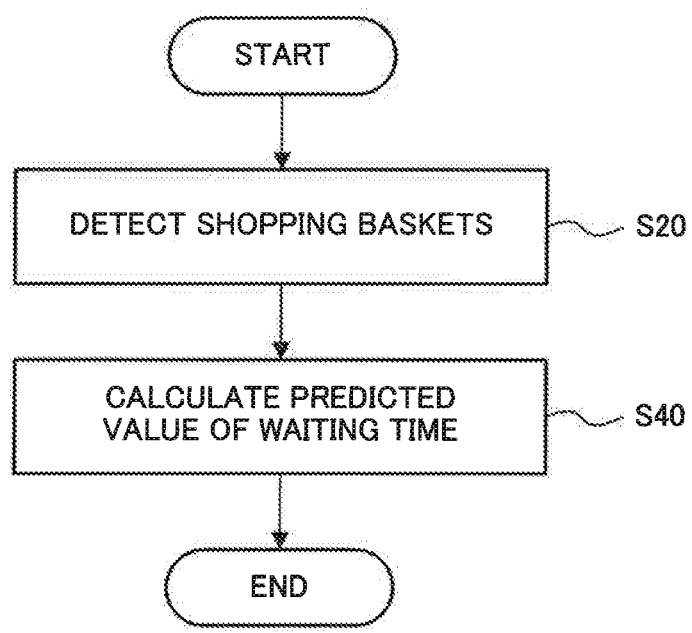
FIG. 28 is a flowchart exemplifying a flow of processing executed by the information processing device according to the eleventh example embodiment.

FIG. 28 is a flowchart exemplifying a flow of processing executed by the information processing device according to the present example embodiment. An operation example of the information processing device 10 according to the present example embodiment will be described below.

The merchandise amount estimation unit 14 detects a number of shopping baskets of people queuing up for a merchandise registration device in response to a predetermined manipulation (manipulation being a trigger for starting information processing) in the information processing device 10 (Merchandise Amount Estimation Step S20 [detection step]). Then, the waiting time estimation unit 18 calculates a predicted value of a waiting time for each merchandise registration device on the basis of the number of shopping baskets (Waiting Time Calculation Step S40).

As described above, the information processing device 10 according to the present example embodiment is able to provide a customer with information about a waiting time.

Twelfth Example Embodiment

An information processing device 10 according to the present example embodiment is similar to the information processing device 10 according to the tenth example embodiment except for an acquisition unit 12 acquiring information indicating a weight change history of a shopping basket, the history being detected by a weight sensor attached to the shopping basket in a queue of people queuing up for a merchandise registration device, instead of information indicating an image capturing a queue of people queuing up for the merchandise registration device, and processing in Merchandise Amount Estimation Step S20 performed by a merchandise amount estimation unit 14.

Processing Configuration

The information processing device 10 according to the present example embodiment has a configuration similar to that illustrated in FIG. 25. The information processing device 10 according to the present example embodiment includes the merchandise amount estimation unit 14 (detection means) and a waiting time estimation unit 18. The merchandise amount estimation unit 14 estimates a merchandise amount for each shopping basket 603 on the basis of information indicating a weight change history of a shopping basket 603, the history being detected by a weight sensor attached to the shopping basket 603. Then, by adding up the estimated merchandise amounts for the respective shopping baskets 603, the merchandise amount estimation unit 14 estimates a total merchandise amount of people queuing up for a merchandise registration device 20.

The waiting time estimation unit 18 calculates a predicted value of a waiting time for each merchandise registration device 20 on the basis of the estimated total merchandise amount.

The acquisition unit 12 according to the present example embodiment may not acquire information indicating an image capturing a queue of people queuing up for the merchandise registration device 20.

The information processing device 10 according to the present example embodiment further includes the acquisition unit 12. The acquisition unit 12 acquires information indicating a weight change history of a shopping basket 603, the history being detected by a weight sensor attached to the shopping basket 603 in the queue of people queuing up for the merchandise registration device 20.

Operation Example

A flow of processing executed by the information processing device 10 according to the present example embodiment may be exemplified by a flowchart similar to that in FIG. 26. An information processing method according to the present example embodiment includes Merchandise Amount Estimation Step S20 (detection step) and Waiting Time Calculation Step S40. In Merchandise Amount Estimation Step S20, a merchandise amount for each shopping basket 603 is estimated on the basis of information indicating a weight change history of a shopping basket 603, the history being detected by a weight sensor attached to the shopping basket 603. Then, a total merchandise amount of people queuing up for a merchandise registration device 20 is estimated by adding up the estimated merchandise amounts for the respective shopping baskets 603. In Waiting Time Calculation Step S40, a predicted value of a waiting time for each merchandise registration device 20 is calculated on the basis of the estimated total merchandise amount. Details will be described below.

The information processing method according to the present example embodiment further includes Acquisition Step S10. In Acquisition Step S10, information indicating a weight change history of a shopping basket 603, the history being detected by a weight sensor attached to the shopping basket 603 in a queue of people queuing up for a merchandise registration device 20 is acquired.

The acquisition unit 12 according to the present example embodiment acquires information indicating a weight change history, similarly to Acquisition Step S10 according to the fifth example embodiment. Next, the merchandise amount estimation unit 14 estimates an amount of intra-queue merchandise, similarly to Merchandise Amount Estimation Step S20 in the method according to the fifth example embodiment or Merchandise Amount Estimation Step S20 according to the sixth example embodiment using the method according to the fifth example embodiment.

Processing in Waiting Time Calculation Step S40 performed by the waiting time estimation unit 18 is similar to the processing in Waiting Time Calculation Step S40 according to the fifth example embodiment except for not calculating estimated time required for checkout. The waiting time estimation unit 18 calculates a predicted value of a waiting time for each merchandise registration device 20 on the basis of an estimated amount of intra-queue merchandise, for example, as follows. The waiting time estimation unit 18 calculates a time obtained by multiplying the number of intra-queue pieces of merchandise estimated by the merchandise amount estimation unit 14 by an average value of time required for registration of each piece of merchandise as estimated time required for merchandise registration. Then, the waiting time estimation unit 18 calculates the estimated time required for merchandise registration as a predicted value of a waiting time for each merchandise registration device 20.

The predicted value of a waiting time calculated by the waiting time estimation unit 18 is displayed on a display unit for customers for each merchandise registration device 20 in such a way that a customer is able to see the value, similarly to the first example embodiment.

The method according to the present example embodiment is also valid in a case that a plurality of cashiers are placed at one merchandise registration device in the system configuration according to the first to ninth example embodiments. In this case, one cashier performs merchandise registration, and another cashier performs checkout. Accordingly, a waiting time for each merchandise registration device 20 may be inferred to be a total sum of time required for merchandise registration, and time required for checkout does not need to be considered. Further, the method according to any one of the first to ninth example embodiments and the method according to the present example embodiment may be switched as appropriate depending on a state of placement of a clerk.

Next, an operation and effect of the present example embodiment will be described. The information processing device 10 and the information processing method, according to the present example embodiment, are able to provide a customer with information about a waiting time. Consequently, the customer is able to finish shopping comfortably. Further, alleviation of congestion and enhanced work efficiency can be provided by customers spreading over respective merchandise registration devices 20 and checkout processing at the store progressing smoothly.

Thirteenth Example Embodiment

An information processing device 10 having a minimum configuration for obtaining the effect of the present invention in the information processing device 10 according to the twelfth example embodiment, according to the present example embodiment, will be described.

Processing Configuration

A processing configuration of the information processing device 10 according to the present example embodiment is similar to that in FIG. 27. As illustrated in the diagram, the information processing device 10 includes a merchandise amount estimation unit 14 and a waiting time estimation unit 18. The merchandise amount estimation unit 14 detects shopping baskets 603 of people queuing up for a merchandise registration device 20 (POS device). The waiting time estimation unit 18 calculates a predicted value of a waiting time for each merchandise registration device 20 on the basis of the detection result by the merchandise amount estimation unit 14. The merchandise amount estimation unit 14 estimates a merchandise amount for each shopping basket 603 on the basis of information indicating a weight change history of a shopping basket 603, the history being detected by a weight sensor attached to the shopping basket 603. Then, by adding up the estimated merchandise amounts for the respective shopping baskets 603, the merchandise amount estimation unit 14 estimates a total merchandise amount of people queuing up for the merchandise registration device 20. The waiting time estimation unit 18 calculates a predicted value of a waiting time for each merchandise registration device 20 on the basis of the estimated total merchandise amount.

Hardware Configuration

The information processing device 10 according to the present example embodiment has a hardware configuration similar to that illustrated in FIG. 15. For example, the merchandise amount estimation unit 14 and the waiting time estimation unit 18, according to the present example embodiment, are provided by program modules for providing functions of the merchandise amount estimation unit 14 and the waiting time estimation unit 18, the program modules being executed by a CPU 101. For example, the program modules for providing the functions of the merchandise amount estimation unit 14 and the waiting time estimation unit 18 are stored in a memory 102.

Operation Example

An operation example of the information processing device 10 according to the present example embodiment will be described. A flow of processing in the information processing device 10 according to the present example embodiment may be illustrated by a flowchart similar to that in FIG. 28.

The merchandise amount estimation unit 14 detects shopping baskets 603 of people queuing up for a merchandise registration device 20 in response to a predetermined manipulation (manipulation being a trigger for acquiring information) in the information processing device 10 (Merchandise Amount Estimation Step S20 [detection step]). Then, the waiting time estimation unit 18 calculates a predicted value of a waiting time for each merchandise registration device 20 on the basis of the detection result in Merchandise Amount Estimation Step S20 (Waiting Time Calculation Step S40). In Merchandise Amount Estimation Step S20, a merchandise amount for each shopping basket 603 is estimated on the basis of information indicating a weight change history of a shopping basket 603, the history being detected by a weight sensor attached to the shopping basket 603. Then, a total merchandise amount of people queuing up for the merchandise registration device 20 is estimated by adding up the estimated merchandise amounts for the respective shopping baskets 603. Further, in Waiting Time Calculation Step S40, a predicted value of a waiting time for each merchandise registration device 20 is calculated on the basis of the estimated total merchandise amount.

As described above, the information processing device 10 according to the present example embodiment is able to provide a customer with information about a waiting time.

While the example embodiments of the present invention have been described above with reference to the drawings, the example embodiments are exemplifications of the present invention and various configurations other than the above may be employed.

For example, while a plurality of steps (processing) are described in sequential orders in the sequence diagrams and the flowcharts used in the aforementioned description, an execution order of steps executed in each example embodiment is not limited to the order in the description. The order of the illustrated steps according to each example embodiment may be changed without affecting the content. Further, the respective aforementioned example embodiments may be combined without contradicting one another.

The respective aforementioned example embodiments will be described more in detail by citing a plurality of examples below. The present invention is not limited in any way by the respective examples below.

Example 1

Figure 29:
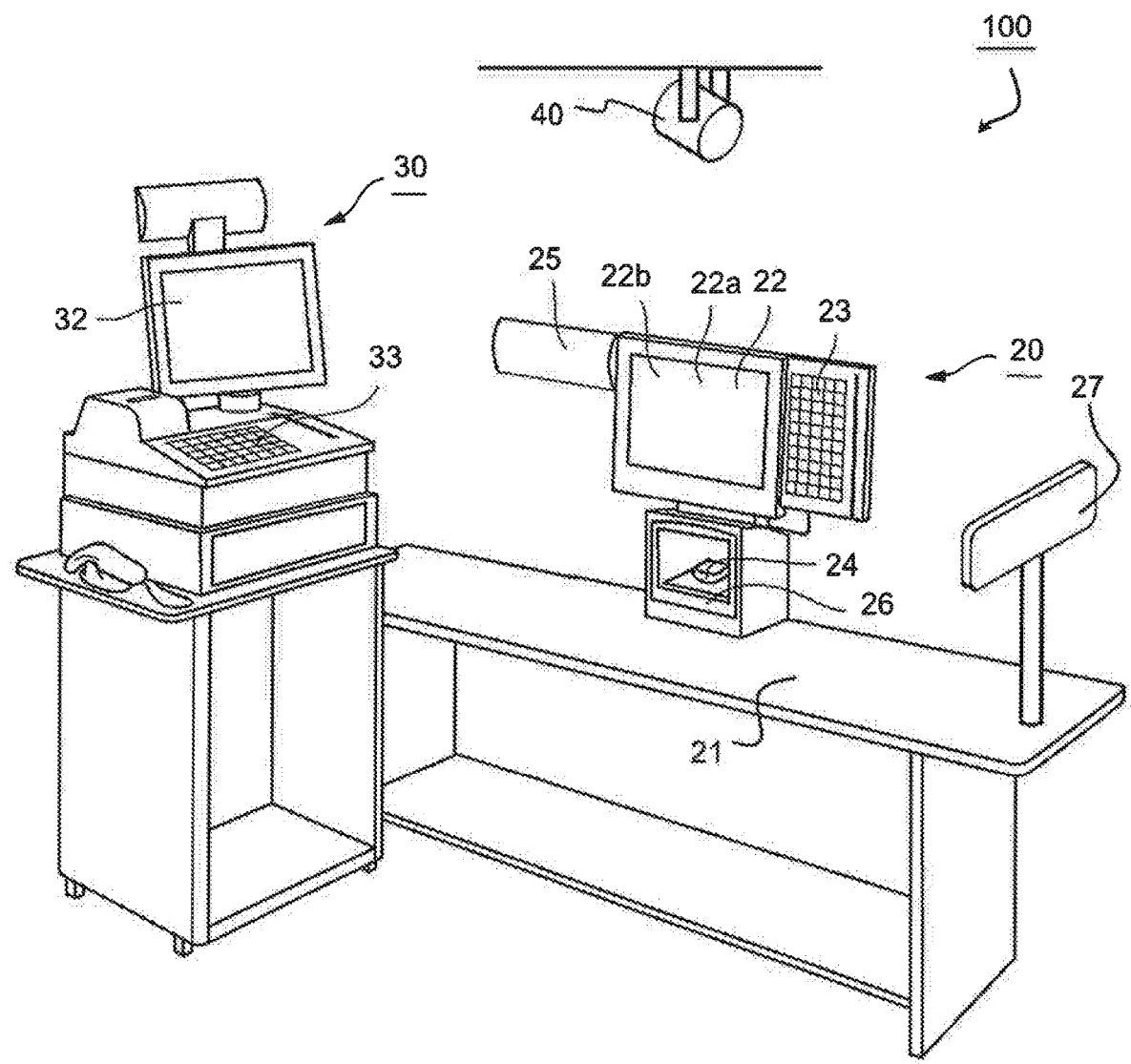
FIG. 29 is a diagram illustrating a configuration example of a POS register device.

FIG. 29 is a diagram illustrating a configuration example of a POS register device. As illustrated in the diagram, an example 1 illustrates an example of the information processing device 10 and the information processing method, according to any one of the first to thirteenth example embodiments, being applied to a POS register device 100. Note that the diagram illustrates a case of the information processing device 10 and the information processing method, according to the third example embodiment, being applied to the POS register device 100, omitting the weight measurement unit 110. The POS register device 100 in the example 1 is configured with a merchandise registration device 20 and a checkout device 30. The merchandise registration device 20 registers merchandise as a checkout target and transmits information of the checkout target merchandise to the checkout device 30. The checkout device 30 performs settlement processing on the checkout target merchandise. The checkout target may be registered by either one of the merchandise registration device 20 and the checkout device 30.

Similarly to FIG. 2, each of the merchandise registration device 20 and the checkout device 30 in the example 1 includes a CPU 101, a memory 102, an input-output I/F 103, and a communication unit 104. The aforementioned information processing device 10 is applicable to either one of the merchandise registration device 20 and the checkout device 30, and the aforementioned information processing method is executable in either one of the merchandise registration device 20 and the checkout device 30.

The aforementioned display unit 105 corresponds to at least one of a display unit 22a in a touch panel unit 22, a display unit 32, and a monitor 27 for customers. For example, a predicted value of a waiting time is displayed on the monitor 27. The aforementioned input unit 106 corresponds to at least one of a touch panel 22b and a keyboard 23 in the touch panel unit 22, and a keyboard 33. The aforementioned imaging unit 107 corresponds to a scanner device 24 and a camera 40. The scanner device 24 captures a merchandise image displaying an external appearance of merchandise held over a read window 26. The camera 40 attached to a ceiling captures an image of a queue of customers queuing up for the merchandise registration device 20. For example, the aforementioned sound collection unit 108 is attached to a part 25 in the merchandise registration device 20, an operator of the POS register device 100, and the like. For example, the aforementioned voice output unit 109 is installed on the merchandise registration device 20 and the checkout device 30.

When registering merchandise as a checkout target, an operator of the POS register device 100 in the example 1 holds the merchandise over the read window 26. Consequently, a merchandise information symbol or the like for obtaining information about the merchandise is read, the information being assigned to the merchandise. Then, by the merchandise information symbol being read, the related merchandise is registered as a checkout target.

While the POS register device 100 in the example 1 includes the merchandise registration device 20 and the checkout device 30, as illustrated in the diagram, the POS register device 100 may be configured with the checkout device 30 only. In this case, the checkout device 30 may include the scanner device 24.

Example 2

Figure 30:
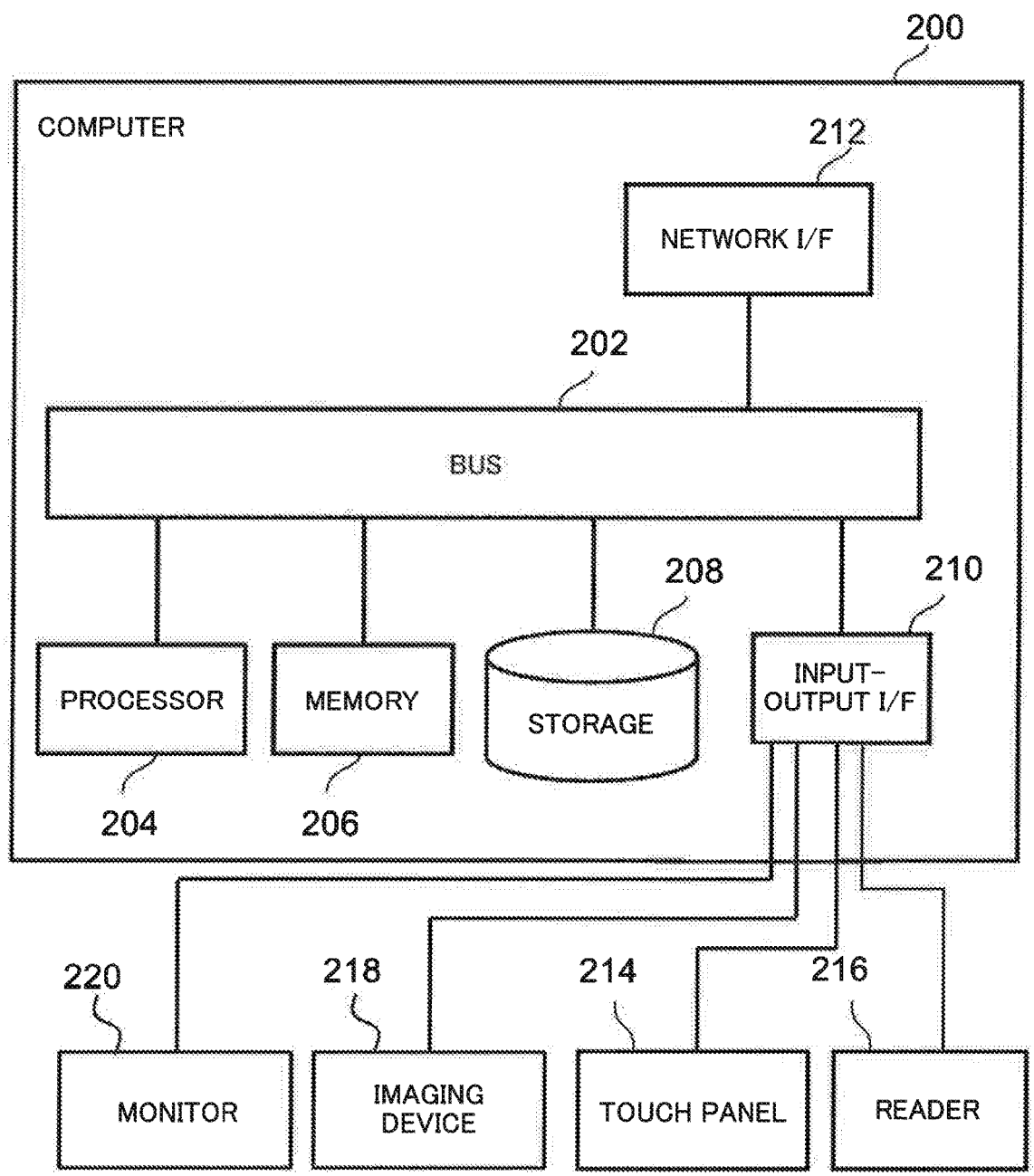
FIG. 30 is a diagram illustrating a configuration example of a merchandise registration device in a semi-self-service POS register device.

FIG. 30 is a diagram illustrating a hardware configuration example of a computer 200 providing a merchandise registration device 20 in a semi-self-service POS register device. An example 2 illustrates an example of the information processing device 10 and the information processing method, according to the tenth or eleventh example embodiment, being applied to the merchandise registration device 20. The POS register device in the example is configured with the merchandise registration device 20 and the checkout device 30, similarly to the example 1 illustrated in FIG. 29. At the semi-self-service POS register device, a clerk performs merchandise registration with the merchandise registration device 20, and a customer performs checkout in person with the checkout device 30.

The merchandise registration device 20 registers merchandise as a checkout target and transmits information of the checkout target merchandise to the checkout device 30. The checkout device 30 performs settlement processing of the checkout target merchandise.

Each functional component in the merchandise registration device 20 may be provided by hardware (e.g. a hardwired electronic circuit) providing each functional component or may be provided by a combination of hardware and software (e.g. a combination of an electronic circuit and a program controlling the circuit).

The computer 200 may be implemented by using a dedicated device designed for a register terminal purpose or may be implemented by using a general-purpose device such as a personal computer (PC) or a mobile terminal.

Hardware Configuration of Merchandise Registration Device 20

The computer 200 includes a bus 202, a processor 204, a memory 206, a storage 208, an input-output interface 210, and a network interface 212. The bus 202 is a data transmission line for the processor 204, the memory 206, the storage 208, the input-output interface 210, and the network interface 212 to mutually transmit and receive data. However, the method of mutually connecting the processor 204 and the like is not limited to the bus connection. The processor 204 is an arithmetic processing unit such as a CPU or a GPU. The memory 206 includes memories such as a RAM and a ROM. The storage 208 includes storage devices such as a hard disk, a solid state drive (SSD), and a memory card. Further, the storage 208 may include memories such as a RAM and a ROM.

The input-output interface 210 is an interface for connecting the computer 200 to an input-output device. In the diagram, a touch panel 214, a reader 216, an imaging device 218, and a monitor 220 are connected to the input-output interface 210. The touch panel 214 accepts input for a clerk to manipulate the computer 200. For example, the touch panel 214 is used to manually input a merchandise price. Additionally, the touch panel 214 displays various types of information such as information about merchandise registered as a checkout target. The reader 216 includes various readers used for registering checkout target merchandise. For example, the reader 216 includes a barcode reader and a camera for recognizing merchandise by image recognition. The computer 200 may be connected to an input interface other than the touch panel 214, such as a keyboard. For example, the imaging device 218 is a camera capturing an image of a queue of customers queuing up for the merchandise registration device 20. For example, the monitor 220 is a display for customers, displaying a predicted waiting time and the like.

The network interface 212 is an interface for communicably connecting the computer 200 to an external device. The network interface 212 may be a network interface for connecting to a wired line or may be a network interface for connecting to a wireless line. For example, the computer 200 for providing the merchandise registration device 20 is connected to a computer 300 (computer for providing the checkout device 30), to be described later, through a network.

The storage 208 stores program modules providing respective functions of the merchandise registration device 20. The processor 204 provides the respective functions related to the respective program modules by executing the respective program modules. When executing the respective aforementioned modules, the processor 204 may read the modules onto the memory 206 and then execute the modules, or may execute the modules without reading the modules onto the memory 206.

The hardware configuration of the computer 200 is not limited to the configuration illustrated in the diagram. For example, each program module may be stored in the memory 206. In this case, the computer 200 may not include the storage 208. Further, the computer 200 may include a drawer 316, a change dispenser 318, and a printer 320, each of which to be described later. In this case, the computer 200 may also be used as the checkout device 30.

By replacing the imaging device 218 with a wireless communication receiver in FIG. 30, a hardware configuration of an example of applying the information processing device 10 and the information processing method, according to the twelfth and thirteenth example embodiments, to the merchandise registration device 20 may be illustrated. The receiver communicates with a transmitter attached to a shopping basket 603.

Next, the checkout device 30 will be described. Each functional component of the checkout device 30 may be provided by hardware (e.g. a hardwired electronic circuit) providing each functional component or may be provided by a combination of hardware and software (e.g. a combination of an electronic circuit and a program controlling the circuit).

Hardware Configuration of Checkout Device 30

Figure 31:
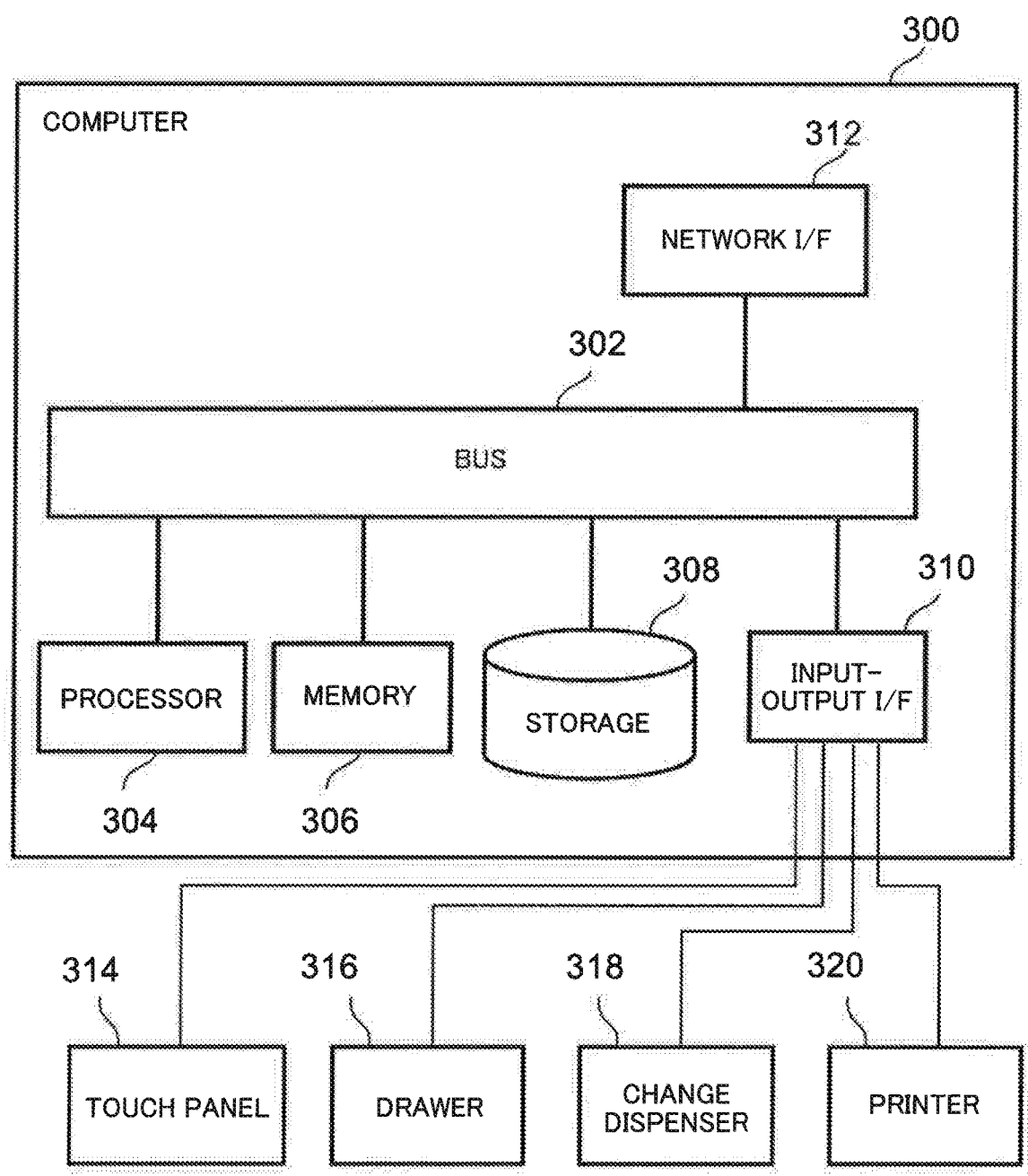
FIG. 31 is a diagram exemplifying a hardware configuration of a computer providing a checkout device in an example 2.

FIG. 31 is a diagram exemplifying a hardware configuration of the computer 300 providing the checkout device 30 in the example. The computer 300 may be implemented by using a dedicated device designed for a register terminal purpose or may be implemented by using a general-purpose device such as a PC or a mobile terminal. The configuration of the computer 300 is largely similar to the configuration of the computer 200. For example, a processor 304 has a function similar to that of the processor 204. Accordingly, description of the similar configurations is omitted.

An input-output interface 310 is connected to a touch panel 314, the drawer 316, the change dispenser 318, and the printer 320. The touch panel 314 accepts manipulations by a customer and a clerk. Further, the touch panel 314 displays various types of information such as a checkout amount related to checkout information. The drawer 316 stores coins and bills. The change dispenser 318 includes a slot for a customer to insert a charge and an outlet for ejecting change. The printer 320 issues a receipt and the like. The computer 300 may be connected to an input interface other than the touch panel 314, such as a keyboard.

The hardware configuration of the computer 300 is not limited to the configuration illustrated in the diagram. For example, each program module may be stored in a memory 306. In this case, the computer 300 may not include a storage 308.

Example 3

Figure 32:
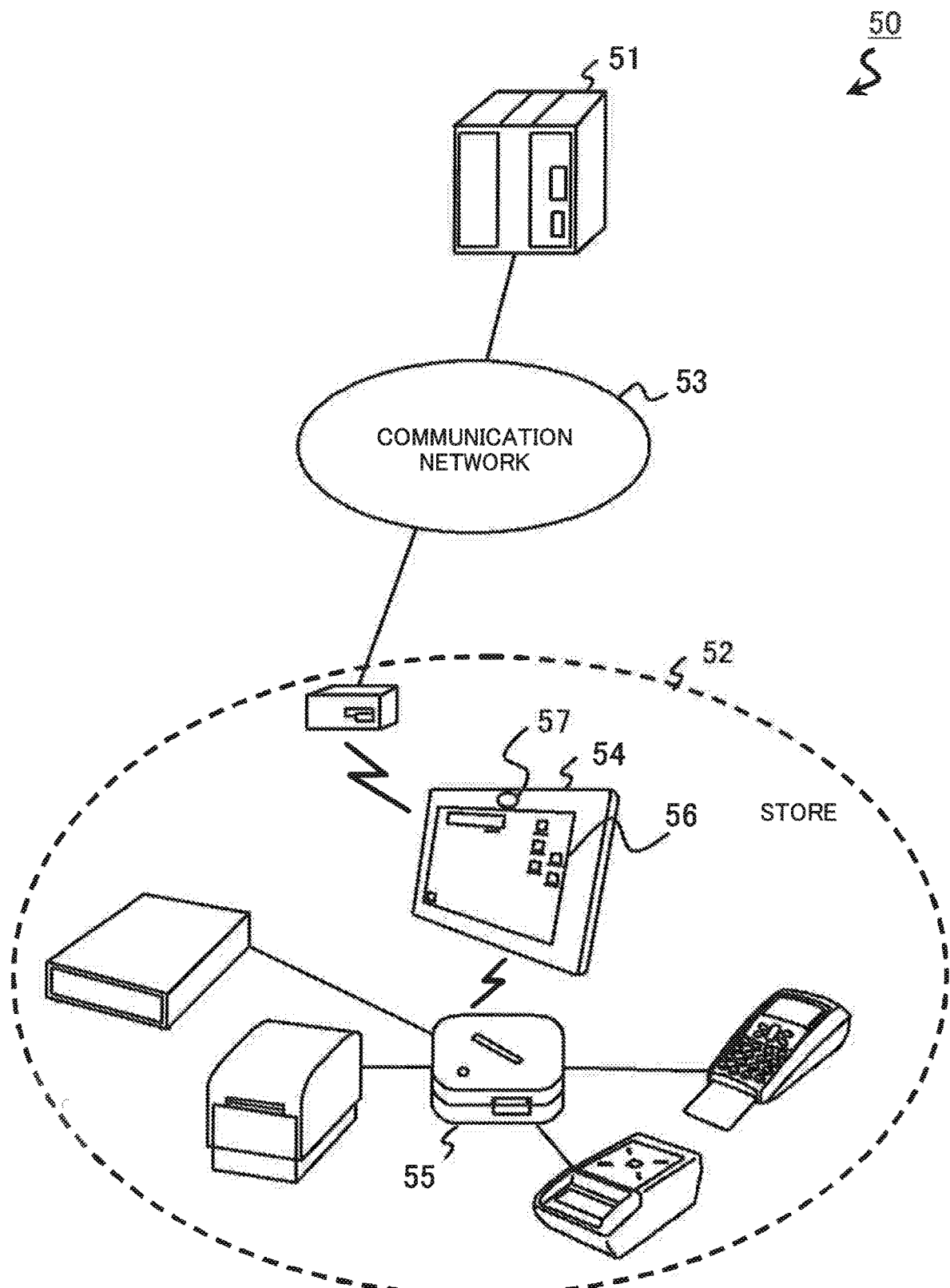
FIG. 32 is a diagram illustrating a configuration example of a POS system.

FIG. 32 is a diagram illustrating a configuration example of a POS system. As illustrated in the diagram, an example 3 illustrates an example of applying the information processing device 10 and the information processing method, according to any one of the first to thirteenth example embodiments, to a POS system 50. The POS system 50 in the example is configured with a server device 51 and a store-side configuration 52, and the server device 51 and the store-side configuration 52 are communicably connected to one another through a communication network 53. The store-side configuration 52 includes a store terminal 54 and a stand 55 that are connectable to the communication network 53 through a communication relay device. The stand 55 is equipment for communicably connecting the store terminal 54 to other pieces of equipment (e.g. a handy scanner, a cash drawer, and a receipt printer).

The store terminal 54 is a general-purpose computer such as a personal computer (PC), a notebook PC, a tablet-type terminal, or a smartphone and, by exchanging data with the server device 51, provides functions similar to those of the POS register devices in the examples 1 and 2.

The store terminal 54 includes a touch panel unit 56, an imaging unit 57, and a microphone (unillustrated). The aforementioned display unit 105 corresponds to a display unit in the touch panel unit 56. The aforementioned input unit 106 corresponds to a touch panel in the touch panel unit 56. The aforementioned imaging unit 107 corresponds to the imaging unit 57. The aforementioned sound collection unit 108 corresponds to a microphone built into the store terminal 54.

The server device 51 is a common server computer and is provided as a web server, an application server, and the like. Similarly to FIG. 2, each of the store terminal 54 and the server device 51 includes a CPU 101, a memory 102, an input-output I/F 103, and a communication unit 104.

The aforementioned information processing device 10 may be provided as the store terminal 54 only or a combination of the server device 51 and the store device. When part of the information processing device 10 is provided by the server device 51, for example, the processing executed by the merchandise amount estimation unit 14, the number-of-people detection unit 16, and the waiting time estimation unit 18 is provided by the server device 51. Then, the processing executed by the acquisition unit 12 is provided by the store terminal 54.

While the example embodiments of the present invention have been described above with reference to the drawings, the example embodiments are exemplifications of the present invention, and various configurations other than the above may be employed.

Examples of reference embodiments are added as follows.

1-1. An information processing device including:

a detection means for detecting a number of shopping baskets of people queuing up for a POS device; and a waiting time calculation means for calculating, on the basis of the number of the shopping baskets, a predicted value of a waiting time for each of the POS devices.

1-2. The information processing device according to 1-1, wherein the detection means estimates, on the basis of the number of the shopping baskets, a merchandise amount of the people queuing up for the POS device, and the waiting time calculation means calculates, on the basis of the merchandise amount of the people queuing up for the POS device, the predicted value of the waiting time for each of the POS devices.

1-3. The information processing device according to 1-2, further including:

an acquisition means for acquiring information indicating an image capturing a queue of the people queuing up for the POS device, wherein the detection means detects a number of the shopping baskets included in a predetermined area in the image.

1-4. The information processing device according to 1-3, wherein the detection means detects the shopping basket included in the predetermined area in the image, estimates a merchandise amount for each of the shopping baskets, and estimates, by using the estimated merchandise amount for each of the shopping baskets, the merchandise amount of the people queuing up for the POS device.

1-5. The information processing device according to 1-4, wherein the detection means detects a height of contents in each shopping basket from the image and estimates, by using the detected height of the contents, the merchandise amount for each of the shopping baskets.

1-6. The information processing device according to 1-5, wherein the detection means detects a number of pieces of merchandise in a top layer in each of the shopping basket from the image and estimates, by using the height of the contents and the number of the pieces of the merchandise in the top layer, the merchandise amount for each of the shopping baskets.

1-7. The information processing device according to any one of 1-4 to 1-6, wherein the detection means corrects the merchandise amount in the shopping basket by using a weight of the shopping basket measured by a weight measurement unit provided in the POS device.

1-8. The information processing device according to any one of 1-3 to 1-7, wherein the detection means further detects a number of carts included in the predetermined area in the image and estimates, by using the detected number of the shopping baskets and a detected number of the carts, the merchandise amount of the people queuing up for the POS device.

1-9. The information processing device according to any one of 1-3 to 1-8, wherein the detection means does not detect a shopping basket beyond a predetermined reference length of the queue of the people queuing up for the POS device, in the image, and estimates, on the basis of a number of the people beyond the reference length, a merchandise amount beyond the reference length.

1-10. The information processing device according to any one of 1-3 to 1-9, wherein, with respect to a person not holding a shopping basket, out of the people queuing up for the POS device in the image, the detection means estimates a predetermined amount as a merchandise amount of the person.

1-11. The information processing device according to 1-2, wherein the detection means estimates a merchandise amount in a shopping basket on the basis of information indicating a weight change history of the shopping basket, the history being detected by a weight sensor attached to the shopping basket, and estimates, by using the estimated merchandise amount in the shopping basket, the merchandise amount of the people queuing up for the POS device, and the waiting time calculation means calculates the predicted value of a waiting time for each of the POS devices on the basis of the estimated merchandise amount of the people queuing up for the POS device.

2-1. An information processing method including:

a detection step of detecting a number of shopping baskets of people queuing up for a POS device; and a waiting time calculation step of calculating, on the basis of the number of the shopping baskets, a predicted value of a waiting time for each of the POS devices.

2-2. The information processing method according to 2-1, wherein, in the detection step, a merchandise amount of the people queuing up for the POS device is estimated on the basis of the number of the shopping baskets, and, in the waiting time calculation step, the predicted value of the waiting time for each of the POS devices is calculated on the basis of the merchandise amount of the people queuing up for the POS device.

2-3. The information processing method according to 2-2, further including an acquisition step of acquiring information indicating an image capturing a queue of the people queuing up for the POS device, wherein, in the detection step, a number of the shopping baskets included in a predetermined area in the image is detected.

2-4. The information processing method according to 2-3, wherein, in the detection step, the shopping basket included in the predetermined area in the image is detected, a merchandise amount for each of the shopping baskets is estimated, and, by using the estimated merchandise amount for each of the shopping baskets, the merchandise amount of the people queuing up for the POS device is estimated.

2-5. The information processing method according to 2-4, wherein, in the detection step, a height of contents in each shopping basket is detected from the image, and the merchandise amount for each of the shopping baskets is estimated by using the detected height of the content.

2-6. The information processing method according to 2-5, wherein, in the detection step, a number of pieces of merchandise in a top layer in each of the shopping basket is detected from the image, and the merchandise amount for each of the shopping baskets is estimated by using the height of the contents and the number of the pieces of the merchandise in the top layer.

2-7. The information processing method according to any one of 2-4 to 2-6, wherein, in the detection step, the merchandise amount in the shopping basket is corrected by using a weight of the shopping basket measured by a weight measurement unit provided in the POS device.

2-8. The information processing method according to any one of 2-3 to 2-7, wherein, in the detection step, a number of carts included in the predetermined area in the image is further detected, and, by using the detected number of the shopping baskets and the detected number of the carts, the merchandise amount of the people queuing up for the POS device is estimated.

2-9. The information processing method according to any one of 2-3 to 2-8, wherein, in the detection step, a shopping basket beyond a predetermined reference length of the queue of the people queuing up for the POS device, in the image, is not detected, and a merchandise amount beyond the reference length is estimated on the basis of a number of the people beyond the reference length.

2-10. The information processing method according to any one of 2-3 to 2-9, wherein, in the detection step, with respect to a person not holding a shopping basket, out of the people queuing up for the POS device in the image, a predetermined amount is estimated as a merchandise amount of the person.

2-11. The information processing method according to 2-2, wherein, in the detection step, a merchandise amount in a shopping basket is estimated on the basis of information indicating a weight change history of the shopping basket, the history being detected by a weight sensor attached to the shopping basket, and, by using the estimated merchandise amount in the shopping basket, the merchandise amount of the people queuing up for the POS device is estimated, and, in the waiting time calculation step, the predicted value of a waiting time for each of the POS devices is calculated on the basis of the estimated merchandise amount of the people queuing up for the POS device.

3-1. A recording medium storing a computer program for providing an information processing device, the computer program causing a computer to function as:

a detection means for detecting a number of shopping baskets of people queuing up for a POS device; and a waiting time calculation means for calculating, on the basis of the number of the shopping baskets, a predicted value of a waiting time for each of the POS devices.

3-2. The recording medium storing the computer program according to 3-1, wherein the detection means estimates, on the basis of the number of the shopping baskets, a merchandise amount of the people queuing up for the POS device and the waiting time calculation means calculates, on the basis of a the merchandise amount of the people queuing up for the POS device, the predicted value of the waiting time for each of the POS devices.

3-3. The recording medium storing the computer program according to 3-2, the computer program further causing the computer to function as an acquisition means for acquiring information indicating an image capturing a queue of the people queuing up for the POS device, wherein the detection means detects a number of the shopping baskets included in a predetermined area in the image.

3-4. The recording medium storing the computer program according to 3-3, wherein
the detection means detects the shopping basket included in the predetermined area in the image, estimates a merchandise amount for each of the shopping baskets, and estimates, by using the estimated merchandise amount for each of the shopping baskets, the merchandise amount of the people queuing up for the POS device.

3-5. The recording medium storing the computer program according to 3-4, wherein
the detection means detects a height of contents in each shopping basket from the image and estimates, by using the detected height of the contents, the merchandise amount for each of the shopping baskets.

3-6. The recording medium storing the computer program according to 3-5, wherein
the detection means detects a number of pieces of merchandise in a top layer in each of the shopping basket from the image and estimates, by using the height of the contents and the number of the pieces of the merchandise in the top layer, the merchandise amount for each of the shopping baskets.

3-7. The recording medium storing the computer program according to any one of 3-4 to 3-6, wherein
the detection means corrects the merchandise amount in the shopping basket by using a weight of the shopping basket measured by a weight measurement unit provided in the POS device.

3-8. The recording medium storing the computer program according to any one of 3-3 to 3-7, wherein
the detection means further detects a number of carts included in the predetermined area in the image and estimates, by using the detected number of the shopping baskets and the detected number of the carts, the merchandise amount of the people queuing up for the POS device.

3-9. The recording medium storing the computer program according to any one of 3-3 to 3-8, wherein
the detection means does not detect a shopping basket beyond a predetermined reference length of the queue of the people queuing up for the POS device, in the image, and estimates, on the basis of a number of the people beyond the reference length, a merchandise amount beyond the reference length.

3-10. The recording medium storing the computer program according to any one of 3-3 to 3-9, wherein,
with respect to a person not holding a shopping basket, out of the people queuing up for the POS device in the image, the detection means estimates a predetermined amount as a merchandise amount of the person.

3-11. The recording medium storing the computer program according to 3-2, wherein
the detection means estimates a merchandise amount in a shopping basket on the basis of information indicating a weight change history of the shopping basket, the history being detected by a weight sensor attached to the shopping basket, and estimates, by using the estimated merchandise amount in the shopping basket, the merchandise amount of the people queuing up for the POS device, and
the waiting time calculation means calculates the predicted value of a waiting time for each of the POS devices on the basis of the estimated merchandise amount of the people queuing up for the POS device.

4-1. An information processing device including:
detection means for detecting shopping baskets of people queuing up for a POS device and estimating a merchandise amount of the people queuing up for the POS device; and
waiting time calculation means for calculating, on the basis of the merchandise amount of the people queuing up for the POS device, a predicted value of a waiting time for each of the POS devices.

5-1. An information processing method including:
a detection step of detecting shopping baskets of people queuing up for a POS device and estimating a merchandise amount of the people queuing up for the POS device; and
a waiting time calculation step of calculating, on the basis of the merchandise amount of the people queuing up for the POS device, a predicted value of a waiting time for each of the POS devices.

6-1. A recording medium storing a computer program for providing an information processing device, the computer program causing a computer to function as:
detection means for detecting shopping baskets of people queuing up for a POS device and estimating a merchandise amount of the people queuing up for the POS device; and
waiting time calculation means for calculating, on the basis of the merchandise amount of the people queuing up for the POS device, a predicted value of a waiting time for each of the POS devices.

This application is based upon and claims the benefit of priority from Japanese patent application No. 2015-195431, filed on Sep. 30, 2015, the disclosure of which is incorporated herein in its entirety by reference.

REFERENCE SIGNS LIST

10 Information processing device
100 POS register device
101 CPU
102 Memory
103 Input-output I/F
104 Communication unit
1041 Portable recording medium
105 Display unit
106 Input unit
107 Imaging unit
108 Sound collection unit
109 Voice output unit
110 Weight measurement unit
111 Reception unit
12 Acquisition means
14 Merchandise amount estimation unit (detection means)
16 Number-of-people detection unit
18 Waiting time estimation unit
20 Merchandise registration device
200 Computer
202 Bus
204 Processor
206 Memory
208 Storage
21 Counter
210 Input-output I/F
212 Network I/F
214 Touch panel
216 Reader
218 Imaging device
220, 27 Monitor
30 Checkout device
300 Computer
302 Bus
304 Processor
306 Memory
308 Storage
310 Input-output I/F 312 Network I/F
314 Touch panel
316 Drawer
318 Change dispenser
320 Printer
40 Camera
50 POS system
51 Server device
52 Store-side configuration
53 Communication network
54 Store terminal
55 Stand
56 Touch panel unit
57 Imaging unit
601 Clerk
602, 602a, 602b, 602c, 602d, 602e, 602f, 602g, 602h Customer
603, 603a, 603b, 603c, 603d Shopping basket
604 Cart
605 Merchandise
606 Group

What is claimed is:

1. An information processing device comprising:
a processor;
a memory storing instructions executable by the processor to:
detect a number of shopping baskets of people queuing up for a POS device and estimates, based on the number of the shopping baskets, a merchandise amount of the people queuing up for the POS device;
calculate, based on the merchandise amount of the people queuing up for the POS device, a predicted value of a waiting time for each of the POS devices; and
acquire information indicating an image capturing a queue of the people queuing up for the POS device, wherein
the processor detects a number of the shopping baskets included in a predetermined area in the image, and
the processor detects the shopping baskets included in the predetermined area in the image, estimates a merchandise amount for each of the shopping baskets, and estimates, by using the estimated merchandise amount for each of the shopping baskets, the merchandise amount of the people queuing up for the POS device.

2. The information processing device according to claim 1, wherein
the processor detects a height of contents in each shopping basket from the image and estimates, by using the detected height of the contents, the merchandise amount for each of the shopping baskets.

3. The information processing device according to claim 2, wherein
the processor detects a number of pieces of merchandise in a top layer in each of the shopping basket from the image and estimates, by using the height of the contents and the number of the pieces of the merchandise in the top layer, the merchandise amount for each of the shopping baskets.

4. The information processing device according to claim 1, wherein
the processor corrects the merchandise amount in the shopping basket by using a weight of the shopping basket measured by a scale provided in the POS device.

5. The information processing device according to claim 1, wherein
the processor further detects a number of carts included in the predetermined area in the image and estimates, by using the detected number of the shopping baskets and the detected number of the carts, the merchandise amount of the people queuing up for the POS device.

6. The information processing device according to claim 1, wherein
the processor does not detect a shopping basket beyond a predetermined reference length of the queue of the people queuing up for the POS device, in the image, and estimates, based on a number of the people beyond the reference length, a merchandise amount beyond the reference length.

7. The information processing device according to claim 1, wherein,
with respect to a person not holding a shopping basket, out of the people queuing up for the POS device in the image, the processor estimates a predetermined amount as a merchandise amount of the person.

8. The information processing device according to claim 1, wherein
the processor estimates a merchandise amount in a shopping basket, based on information indicating a weight change history of the shopping basket, the history being detected by a weight sensor attached to the shopping basket, and estimates, by using the estimated merchandise amount in the shopping basket, the merchandise amount of the people queuing up for the POS device, and
the processor calculates the predicted value of a waiting time for each of the POS devices, based on the estimated merchandise amount of the people queuing up for the POS device.

9. An information processing method comprising:
detecting a number of shopping baskets of people queuing up for a POS device;
calculating, based on the number of the shopping baskets, a predicted value of a waiting time for each of the POS devices;
acquiring information indicating an image capturing a queue of the people queuing up for the POS device;
detecting a number of the shopping baskets included in a predetermined area in the image; and
detecting the shopping baskets included in the predetermined area in the image, estimating a merchandise amount for each of the shopping baskets, and estimating, by using the estimated merchandise amount for each of the shopping baskets, the merchandise amount of the people queuing up for the POS device.

10. A non-transitory computer readable recording medium storing a computer program for providing an information processing device, the computer program causing a computer to perform processing comprising:
detecting a number of shopping baskets of people queuing up for a POS device; and
calculating, based on the number of the shopping baskets, a predicted value of a waiting time for each of the POS devices;
acquiring information indicating an image capturing a queue of the people queuing up for the POS device;
detecting a number of the shopping baskets included in a predetermined area in the image; and
detecting the shopping baskets included in the predetermined area in the image, estimating a merchandise amount for each of the shopping baskets, and estimating, by using the estimated merchandise amount for each of the shopping baskets, the merchandise amount of the people queuing up for the POS device.

\* \* \* \* \*